(12) United States Patent
Sullivan

(10) Patent No.: US 10,545,993 B2
(45) Date of Patent: Jan. 28, 2020

(54) METHODS AND SYSTEMS OF CRDT ARRAYS IN A DATANET

(71) Applicant: Russell Sullivan, San Jose, CA (US)

(72) Inventor: Russell Sullivan, San Jose, CA (US)

( * ) Notice: Subject to any disclaimer, the term of this patent is extended or adjusted under 35 U.S.C. 154(b) by 299 days.

(21) Appl. No.: 15/075,093

(22) Filed: Mar. 18, 2016

(65) Prior Publication Data

US 2017/0024451 A1 Jan. 26, 2017

Related U.S. Application Data

(60) Provisional application No. 62/135,164, filed on Mar. 19, 2015.

(51) Int. Cl.
*G06F 17/30* (2006.01)
*G06F 16/27* (2019.01)

(52) U.S. Cl.
CPC .................. *G06F 16/273* (2019.01)

(58) Field of Classification Search
None
See application file for complete search history.

(56) References Cited

U.S. PATENT DOCUMENTS 5,893,086 A * 4/1999 Schmuck ............ G06F 11/1435
6,314,424 B1 * 11/2001 Kaczmarski ...... G06F 17/30905
2002/0059210 A1 * 5/2002 Makus ............... G06F 17/30991
2003/0177152 A1 * 9/2003 Darnell .................. G06F 9/445
2006/0173807 A1 * 8/2006 Weir .................. G06F 17/30634
2012/0166390 A1 * 6/2012 Merriman ......... G06F 17/30578
707/613
2015/0193466 A1 * 7/2015 Luft ................... G06F 17/30194
707/634
2015/0234655 A1 * 8/2015 Steinmacher-Burow ...................
G06F 9/30043
711/125

* cited by examiner

*Primary Examiner* — Alex Gofman

(57) ABSTRACT

In one aspect, a computerized method for implementing Conflict-free Replicated Data Type (CRDT) arrays in a datanet and useful for improving data storage systems includes the step of providing a CRDT array, wherein the CRDT array comprises a linked list. The method includes the step of arranging each CRDT array element of the CRDT array to include a left-hand-neighbor (LHN) pointer. The method includes the step of setting the LHN pointer to point to a previous CRDT element in the linked list. The method includes the step of specifying the previous CRDT element's unique tuple. The method includes the step of including the previous CRDT element's unique tuple into the LHN pointer. The method includes the step of distributed garbage collection. The method includes a step for updating data deltas with previous (as relative to the PrimaryDataCenter's current GC-version) garbage-collection-version to the current version or on failure designating the stale data delta to be Ignored. The method includes synchronization for CRDT arrays that have locally and remotely created data-deltas while the Agent was offline. The method includes the step of distributed garbage-collection reaping.

4 Claims, 18 Drawing Sheets

| AGENT | ELEMENT | TIMESTAMP | LHN |
| --- | --- | --- | --- |
| 1 | A1 | 1 | 0 |
| 1 | B1 | 2 | A1 |
| 1 | C1 | 3 | B1 |
| 2 | B2 | 3 | A1 |
| 2 | C2 | 4 | B2 |
| 3 | C3 | 5 | B2 |
| 3 | D3 | 6 | C3 |
| 4 | B4 | 4 | A1 |
| 4 | C4 | 5 | B4 |

METHODS AND SYSTEMS OF CRDT ARRAYS IN A DATANET

CROSS-REFERENCE TO RELATED APPLICATIONS

This application is a claims priority from provisional U.S. Application Provisional No. 62/135,164 filed Mar. 19, 2015. This application is hereby incorporated by reference in its entirety.

FIELD OF THE INVENTION

This application relates generally to databases, and more specifically to a system, article of manufacture and method of CRDT arrays in a datanet.

DESCRIPTION OF THE RELATED ART

Local caching systems in a computer network may not be ubiquitous and may only read data but (e.g. not also modify the data). Accordingly, a datanet that includes local caching systems that enables systems to modify data with delayed network I/O may be a desired improvement to the current art. For example, this can render OOMs more responsive and can provide improvements in replication robustness. Such a local caching system could support numbers, strings, objects, and/or arrays, as well as, apply CRDT algorithms to automatically resolve conflicts. Accordingly, it is desirous that a datanet's increase in responsiveness be applied at both the micro and macro levels in order to dramatically increase the overall responsiveness of the Internet itself at both levels.

BRIEF SUMMARY OF THE INVENTION

In one aspect, a computerized method for implementing Conflict-free Replicated Data Type (CRDT) arrays in a datanet is useful for improving data storage systems and includes the step of providing a CRDT array, wherein the CRDT array comprises a linked list. The method includes the step of arranging each CRDT array element of the CRDT array to include a left-hand-neighbor (LHN) pointer. The method includes the step of setting the LHN pointer to point to a previous CRDT element in the linked list. The method includes the step of specifying the previous CRDT element's unique tuple. The method includes the step of including the previous CRDT element's unique tuple into the LHN pointer. The method includes distributed garbage collection of array tombstones and dealing both correctly and deterministically with distributed race conditions while retaining strong SEC data guarantees.

BRIEF DESCRIPTION OF THE DRAWINGS

FIG. 15 illustrates an example list of elements in a CRDT array, according to some embodiments.

Figure 1:
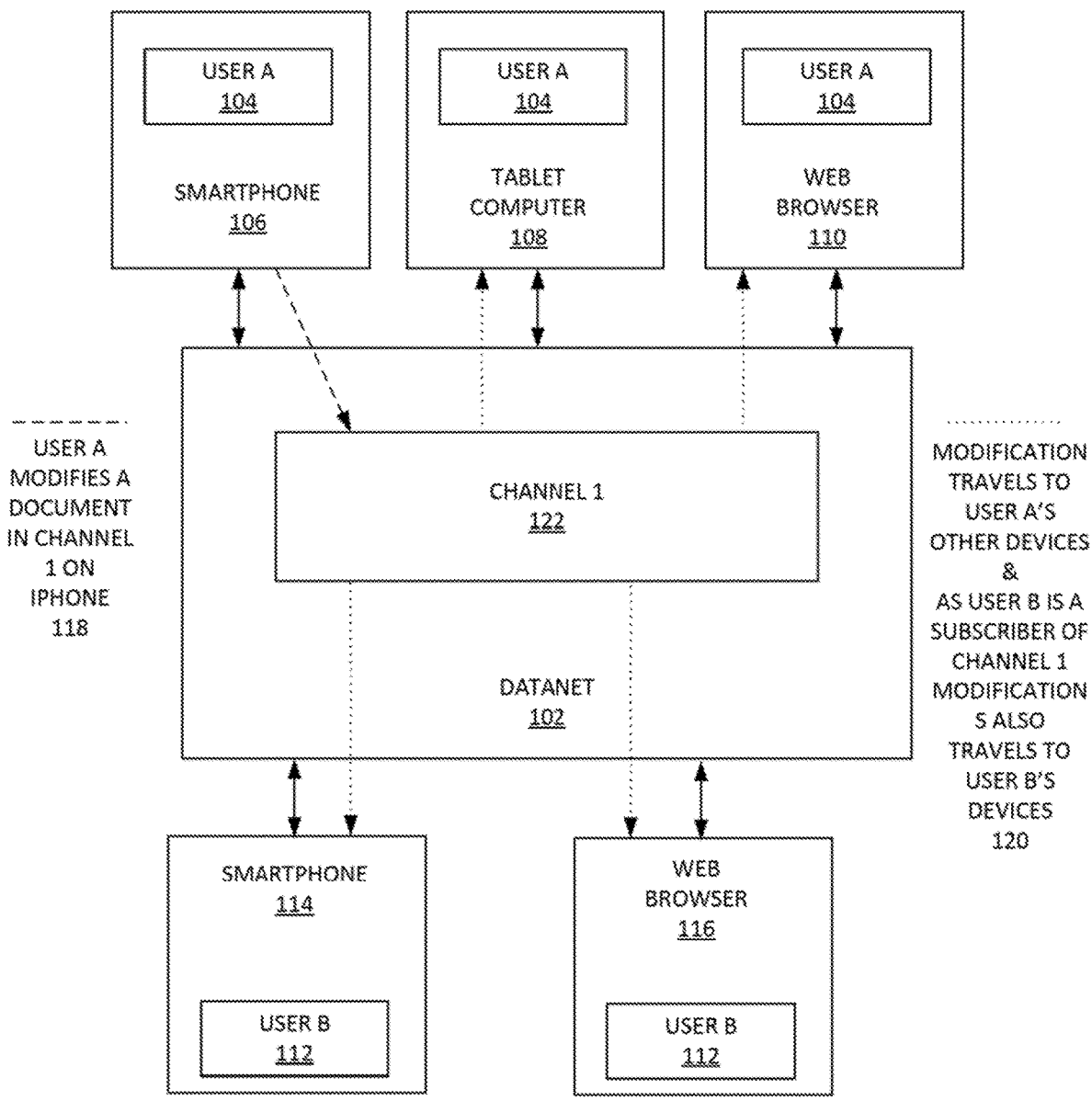
FIG. 1 illustrates an example of PubSub replication, according to some embodiments.

The Figures described above are a representative set, and are not an exhaustive with respect to embodying the invention.

DESCRIPTION

Disclosed are a system, method, and article of manufacture CRDT arrays in a datanet. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is Included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Example Definitions

ACID (Atomicity, Consistency, Isolation, Durability) can be a set of properties that guarantee that database transactions are processed reliably.

ACK can be an acknowledgement of a packet receipt.

Application server can be a software framework that provides a generalized approach to creating an application-server implementation and/or a server portion of a specific implementation instance.

Conflict-free replicated data type (CRDT) (can also be termed a 'conflict-free replicated type' or a 'commutative replicated data type') can be a data type whose operations commute when they are concurrent. CRDTs can be used to achieve strong eventual consistency and/or monotonicity (e.g. an absence of rollbacks). CRDTs can be used to replicate data across multiple computers of a network, executing updates with the need for remote synchronization. Additional information on CRDTs is provided infra. Types of CRDT's include, inter alia, operation-based CRDT or a state-based CRDT. In some examples, strong eventual consistency is a property of an eventually-consistent systems. For example, replicas that have received and applied the same set of updates can immediately have an equivalent state. There may be no conflict arbitration process. CRDTs can be used to achieve strong eventual consistency in a distributed system.

Datacenter can house computer systems and associated components, such as telecommunications and storage systems.

Datanet can be a global system of connected databases that maintains consistency through Viral Commutative Replication. The datanet can be designed to synchronize data between multiple (e.g. 2-100) datacenter databases and many more (e.g. in terms of thousands to billions in number) device-embedded databases. A datanet can support supporting lossless offline availability. Additional information on the datanet is provided Infra.

Garbage collection can be a memory-management process that reclaims 'garbage', or memory occupied by objects, that are no longer in use by the program.

Amazon Elastic Compute Cloud (EC2) can be a commercial web service for hosting computer applications.

Tombstone can be a sign in a replica that information has been deleted.

Delta can include a write operation that commits data to memory, a mass storage device, etc.

JavaScript Object Notation (JSON) can be an open standard format that uses human-readable text to transmit data objects consisting of attribute-value pairs.

Key can be a data element that enables location of associated data values(s).

Least Recently Used (LRU) can be a caching algorithm that discards the least recently used items first.

Players can be datanet entities such as, Inter alia: agents, data centers, etc.

Publish-subscribe (PubSub) can be a messaging pattern where senders of messages, called publishers, do not program the messages to be sent directly to specific receivers, called subscribers. Instead, published messages are characterized into classes, without knowledge of what, if any, subscribers there may be. Similarly, subscribers express interest in one or more classes, and only receive messages that are of interest, without knowledge of what, if any, publishers there are.

Systems in which replica conflicts are impossible by design exhibit Strong Eventual Consistency (SEC).

Tree can be a data structure that emulates a tree structure with a set of linked list nodes.

Causal consistency can be a consistency model used in the domain of concurrent programming (e.g. in distributed shared memory, distributed transactions etc.). A system can provide causal consistency if memory operations that potentially are causally related are seen by every node of the system in the same order.

Example Architecture, Methods and Systems

In one embodiment, a datanet can synchronize data between many geographically distributed databases (e.g. data-center databases, local databases in user-side devices, etc.) and can ensure correctness of replication under numerous failure scenarios using, inter alia, Viral Commutative Replication (VCR). Database can span multiple data centers. Each data-center database can synchronize to each other data-center database in a fully connected mesh. Within a datanet, the data can be replicated from an agent (e.g. an agent can be located on mobile-devices as well as IoT devices) to datanet datacenters and/or the subscribers in a minimal amount of network hops and/or in parallel. The datanet can synchronize data between online devices in substantially real-time.

A data modification (e.g. a delta, replications, etc.) can be initiated by an agent. Data modifications can be implemented via commutative operations. For example, CRDTs can be utilized by the datanet. The datanet provides a single key isolation on JSON data-structures. JSON data-structures (e.g. numbers, strings, objects, arrays, etc.) can be stored as CRDTs. Nesting can be supported. Operations to JSON data-structures can be implemented via commutative operations. CRDT logic can merge changes made while an agent is offline. CRDT logic can provide that data is not discarded during this merger. A datanet can utilize JSON application programming interfaces (APIs) as well. Single key isolation can be provided that does not utilize ACID-based transactions. Causal consistency can ensure delta applications are done in a globally consistent manner.

A data modification can be communicated to a datacenter (e.g. a datacenter that is geographically closer to the agent than other datacenters). The data modification can be replicated by the datacenter to other datacenters. The data modification can then be sent to various subscribers. In one example, a data modification can utilize bi-directional replication. Data modifications infect every datacenter and device they encounter and continue to re-infect until cured by ACKs. Every data modification from every relevant device can be replicated to all relevant datacenters in the datanet as well as any subscribing device. Once a datacenter and/or a subscribing device receives a data modification, it can wait on an ACK for the data modification, if no ACK is received in timely fashion, the data modification can be resent to the datanet. In a datanet, writes can be propagated to pluggable database. Queries can be done in the plugged-in database or proxied by the datanet. Various definitions and/or descriptions of a datanet and/or datanet entities are now provided.

Example DC_Clusters

The datanet can comprise multiple datacenter components that collectively form a fully connected mesh cluster. The datacenter components can include and/or be referred to as DC_Clusters herein. DC_Clusters can act as the data-reservoirs of the datanet. DC_Clusters can synchronize the various modifications they receive with other DC_Clusters (e.g. all other DC_Clusters) in the datanet. In the event a DC_Cluster goes offline (or comes online for the first time), it can first be re-synchronize (and/or populated) before it can be considered 'live'. DC_Clusters can serve to synchronize data between the datanet's many devices (e.g. see the various architecture figures and/or descriptions provided herein).

A device can be connected to a single DC_Cluster. In some examples, a device can be a mobile-phone-application, an IoT (Internet-of-Things (IoT))-application, a browser-application, an application-server, etc. The device can push its modifications to a single DC_Cluster and receives all of its updates (e.g. updates from other devices) from this single DC_Cluster. Devices can connect to a nearest DC_Cluster. In one example, synchronization between two devices connected to two different DC_Clusters can be implemented according to the following sequence. The synchronization process can start at a first device, then travel to that device's DC_Cluster, then travel to the other device's DC_Cluster, and finally travel to the other device.

The datanet supports users. User can be authenticated via username/password logins. Users station themselves on devices. A user subscribes to various channels (e.g. publication channels). Users can authenticate via username/password logins. Users can be stationed on devices (e.g. mobile-app instance on an iPhone). As noted herein, documents include data and specify channels (e.g. replication channels). Users subscribe to channels (respective of various privileges). The datanet can ensure that modifications to documents in channels a user is subscribed to are replicated to devices where a user is stationed. For example, when a document is modified, any user who subscribed to the document's channel can receive the modification. The modification can be received on all devices on which the user can be stationed.

Example 'Players'

A player can be an agent, a datacenter, etc. The first player in the datanet's architecture can be the agent. An agent can reside on a device. Agents can have their own (e.g. local) database and connect clients to datacenter cluster nodes. The second player in the datanet's architecture can be the client. In an example with the device as an application-server, the client can be an application-server library. For example, in some device instances (e.g. mobile-phone-application, IoT-application, browser-application) the client and agent can be within the same process and communicate via function calls. Example client and agent configurations are now provided.

Application-Server: Ruby-client↔Localhost-agent (e.g. a Node.js process).

IOS: Both client and agent embedded in mobile-app as iOS library.

Browser: Both client and agent embedded in browser-app as JavaScript library.

The third player in the datanet's architecture can be a cluster node. Cluster nodes can collectively form clusters in DC_Clusters (e.g. datacenters). Cluster nodes can be added to scale compute horizontally (elasticity). For instance, four cluster nodes can form a cluster in an EC2 region. DC_Clusters can act as proxies for various underlying databases (e.g. distributed databases) located in the same datacenter. For example, a DC_Cluster in an EC2 region can proxy to a MongoDB-cluster (or other a cross-platform document-oriented database cluster) located in the same EC2 region. Cluster nodes can be stateless and handle the serialization of Data-I/O (e.g. in VCR) and also the publishing of data-modifications to remote DC_Clusters and/or subscribers (e.g. agents subscribing to a channel).

The datanet supports multiple DC_Clusters in geographically distributed datacenters. These can form a datanet's GeoCluster. The DC_Clusters in the GeoCluster can include full copies of the data in the datanet. Accordingly, they act as hot-failovers for one another. Agents can be free to switch from one DC_Cluster to another. VCR can ensure that agents switching between datacenters do not lose data or miss updates on subscribed data. The switch can be seamless for both the agent and the datanet.

Example Data Model

The datanet can be a DocumentStore. The data in the datanet can be represented as JSON data-structures. JSON can supports numbers, strings, objects, arrays and objects. Arrays can be nestable. The datanet can supports various operations on JSON data-structures and perform modifications as commutative operations (the 'C' in VCR). The datanet can also provide various advanced data-structures, including, inter alia: CAPPED-LIST (e.g. stack or queue), ORDERED-LIST, etc. These advanced data-structures can be nestable inside documents. For example, a single document can contain multiple advanced data-structures.

Example PubSub Data Propagation

The datanet propagates data PubSub style. Documents in the datanet specify channels (e.g. public channels) in the document itself (e.g. using field-name: '_channels:[ ]'). Users can be granted read/write access to channels (e.g. by Admin-users). An agent can have write privileges to one of a document's channels in order to modify the document. When an agent modifies a document, the modifications can be replicated to the agents subscribing to this document's channels (e.g. to all agents subscribing to this document's channels). For example, when an agent can create and/or modify a document containing '_channels:[1,2]' the modifications are replicated to the subscribers of channels 1 and 2.

FIG. 1 illustrates an example of PubSub replication, according to some embodiments. In operation 118, user A 104 can modify a document on smart phone 106. The document may be in Channel 1 122 within the datanet 102. User A can also utilize a tablet computer 108 and a web browser 110. User B 112 can also subscribe to Channel 122. Users can be stationed on devices (e.g. Instances on user A's devices 106-110 and user B's devices 114-116). The modification is propagated to instances stationed on user A's other device in step 120. User B is a subscriber of Channel 1. Therefore, the modification is also propagated to instances stationed on user A's other devices in step 120.

Replication Data Flow

Data modifications can originate at agents. A modification can be applied at the agent's local database and then replicated as a delta to the DC_Cluster to which the agent can be currently connected (e.g. represented in the example below DC1). The Delta can be then replicated to other DC_Clusters (e.g. abbreviated: DC2 and DC3 infra) in the datanet. When a DC_Cluster (e.g. DC1, DC2, and/or DC3) receives a Delta, it can first apply the Delta to its local database and then replicate the Delta to other locally-connected subscribers (e.g. of the document's channels).

In one example, DC1 can be located in Palo Alto, Calif. and DC2 can be located in Tokyo, Japan. If agent_A can be located in Las Vegas and subscriber_B can be located in Seattle, the Delta can travel via DC1 (in Palo Alto), making only two hops. If subscriber_F is located in Seoul, Korea, the Delta from agent_A can first go to DC1 (in Palo Alto) and from there to DC2 (in Tokyo) and from there to subscriber_F, making three hops.

VCR can enable Deltas to be live before they are globally ACKed. In some example scenarios (e.g. low latency between datacenters (e.g. 100 milliseconds (ms) Palo Alto<→Tokyo) and low last-mile latencies to Endusers {e.g. 10 milliseconds (ms))) may yield system-wide GLOBAL replication of a modification between Endusers can be implemented within 120 milliseconds (ms). In another example scenario (e.g. in 2015: Palo Alto<→Tokyo datacenter Latencies: 200 ms+, Last-Mile latency to Endusers: 50 milliseconds (ms)) can be system-wide GLOBAL replication latencies between Endusers in the 300-500 milliseconds (ms) range. These examples are provided by way of example and not of limitation.

VCR can use asynchronous replication (e.g. a write is considered complete as soon as local storage acknowledges it). Asynchronous replication can be used to achieve low latency when replicating data at the global scale. Nonetheless VCR can provide datanet-wide strong eventual consistency (SEC) on the various writes. The datanet can provide low latency and strong data guarantees on the global scale. VCR can provide viral robustness and one-phase commit 'liveness'. VCR-related reads and writes have substantially zero latency (e.g. can include computer hardware and operating system latency, etc.). Database I/O can take place on localhost databases.

Example SEC and CRDT

Strong eventual consistency (SEC) can be the replication guarantee provided by Conflict-free Replicated Data Types (CRDTs). CRDTs may apply replication out-of-order (as Causal Consistency defines: e.g. across agents, not w/respect to a single agent) and still converge to the same final result as if the replication had been applied in-order. In other words, in SEC the order of application of replication may not matter. Being freed from the ordering-of-replication constraint allows SEC to support concurrent replication from different sources (e.g. devices and/or datacenters) without sacrificing strong data guarantees. SEC can be implemented for two example use-cases. The first use-case can be mobile-devices and/or IoT-devices which frequently either go offline and/or are not actively connected to the Internet (e.g. to save battery-life). With SEC the mobile device and/or IoT device can be free to make modifications while offline. SEC can ensure correctness when the replication occurs at a later time.

A second example use-case can be in wide-area network (WAN) replication where latencies between datacenters may be high and variable. In this example, SEC allows replication to flow (e.g. in both directions simultaneously) at the pace the WAN connections allow without sacrificing correctness and/or losing data when two masters' (e.g. from different datacenters) modifications conflict. Finally, SEC can be superior to classic eventual consistency which can have the fundamental weakness of throwing away the data that loses during conflict resolution, a subtle tradeoff that effectively voids any notion of legit write guarantees.

Robustness

The datanet can be modeled after the Internet's original purpose of being a system designed to function during and after a nuclear war. The datanet can survive a multitude of concurrent failures without losing data or availability. The datanet can support, inter alia, the following: an agent can make modifications while offline and SEC guarantees hold (so long as the agent eventually reconnects to the datanet); cluster nodes can crash or be added dynamically (duster elasticity) and substantially no data can be lost; an entire DC_Cluster can become unreachable and no data can be lost; network partitions in datacenters can happen and no data can be lost (including during partition and after partition heals); multiple concurrent datacenters can become unreachable and no data can be lost; and/or datacenters in the datanet can become unreachable and no data can be lost.

When the datacenters are unreachable, replication may not be possible but the agents can still perform writes locally (e.g. availability can be diminished but not lost). This means substantially no data can be lost. Replication can be on hold until a DC_Cluster comes back online. Once a single datacenter comes back online, datanet-wide replication can resume and substantially no data can have been lost (e.g. system-wide). This can be how the datanet can make the claim of substantially one-hundred percent uptime.

Example Viral Commutative Replication (VCR)

The name Viral Commutative Replication uses the term viral as a metaphor to describe how data modifications spread rapidly, infect other devices, and survive until they have been explicitly eradicated. Every data modification in the datanet produces a delta and once this delta can have been passed onto another player in the datanet (e.g. DC or subscriber), it becomes that player's responsibility to keep retransmitting the delta until the delta can have been explicitly eradicated (by being globally ACKed). In other words, each player infected with a delta does its best to infect the rest of the datanet with the delta so long as that player survives. This viral aspect of replication can yield robustness to numerous failure scenarios.

For example, given a two DC_Cluster setup, where each DC_Cluster can have two agents locally connected, a single delta's flow can be the following: 1.) agent1 authors delta and sends it to his DC_Cluster (DC_1); 2.) from DC_1 delta can be sent to subscribers (Sub2) connected to DC_1; 3.) from DC_1 delta can be sent to DC_2; 4.) from DC_2 delta can be sent to subscribers (Sub3,Sub4) connected to DC_2.

The delta can have spread to four subscribers (e.g. authoring agent included) and to two DC_Clusters. At this point all can be infected with the delta. If any of these six players loses connectivity, the delta may not be globally removed from the system. Once the offline player comes back online, the player can do his best to re-infect the datanet with the delta. Further, once a delta exists, it can survive so long as a single player containing the delta survives. Given the six players in the example above, any five of the players (e.g. including both DC_Clusters) can fail simultaneously and the delta can still ultimately survive. Once a DC_Cluster comes back online, the surviving player can re-infect substantially the entire datanet with the delta.

Example Queries

The datanet can proxy modifications to each player's underlying database (e.g. for both DC_Clusters and agents). It is noted that the datanet's players are involved in the modification of data, and not in the querying of data. The querying of data can be delegated to the underlying database layer directly, and thus bypassing the datanet (e.g. for queries). In one example of a datacenter, the datanet can support MongoDB® as a plugin. In other examples, other database systems such as, for example, ElasticSearch® can be supported.

In a web browser (e.g. and/or other software applications for retrieving, presenting and traversing information resources on the World Wide Web), the datanet can support LocalStorage as a plugin. In other examples, the datanet can support IndexedDB and WebSQL, etc. On mobile applications, the datanet can support SQUite and provides libraries to help query JSON data-structures/documents in SQL. On the application server, the datanet support database systems such as, inter alia: MongoDB, LevelDB®, RocksDB®, etc. A datanet setup can use the datanet to handle datacenter NetworkPartition logic with datacenter queries proxied via the datanet.

Detailed Delta Flow

All modifications (e.g. CreateDocument, ModifyDocument, RemoveDocument) can be framed as deltas in the datanet. Deltas can be created by agents and move from agent to DC_Cluster (and/or to other DC_Clusters) to subscribers. The following can be a detailed diagram a delta flow through a single DC_Cluster to a subscriber connected to the same DC_Cluster. The following legend can be utilized for the flow: AD-AgentDelta; CD-ClusterDelta; GD-GeoDelta; CSD-ClusterSubscriberDelta; SD-SubscriberDelta. AgentMaster: responsible for serializing I/O FROM the agent (e.g. forward AgentDeltas FROM the agent). KeyMaster: responsible for serializing data I/O ON a single key (the primary key of a document). SubscriberMaster can be responsible for serializing data I/O to a subscriber (e.g. send SubscriberDeltas/Merges to subscriber).

In one example, AgentA and AgentB can be subscribed to channel 1 and AgentA modifies a document with {key:'X',_channel:1} using the following steps:

10.) AgentA sends an AgentDelta to its AgentMaster
20.) AgentMaster(A) looks up KeyMaster(X) in its partition-table
30.) AgentMaster(A) sends a ClusterDelta to KeyMaster(X)
40.) KeyMaster(X) applies delta locally (saves resulting document to DB)
50.) KeyMaster(X) sends a GeoDelta to other DC_Clusters
60.) KeyMaster(X) looks up all LOCAL subscribers to channel(1)→AgentA and AgentB are subscribed to this channel. We can ignore AgentA in this case as it can be the author of the delta
70.) KeyMaster(X) sends a ClusterSubscriberDelta to SubscriberMaster(B)
80.) SubscriberMaster(B) sends a SubscriberDelta to subscriber(B)
90.) subscriber(B) applies delta locally (saves resulting document to DB)

AgentC now subscribes to _channel:1 and can be connected to DC_Cluster_2. AgentA modifies the same document {key:'X'}, the following additional steps happen can be inserted between steps 50 and 60:

51.) At DC_2, AgentMaster(KeyMaster_X) receives GeoDelta
52.) AgentMaster(KM_X) looks up KeyMaster(X) in its partition-table
53.) AgentMaster(KM_X) sends a ClusterDelta to KeyMaster(X)
54.) KeyMaster(X) looks up all LOCAL subscribers to replication-channel(1)→AgentC can be subscribed to this channel and LOCY connected.
55.) KeyMaster(X) sends a ClusterSubscriberDelta to SubscriberMaster(C)
56.) SubscriberMaster(C) sends a SubscriberDelta to subscriber(C)
57.) subscriber(C) applies delta locally (saves resulting document to DB)

GeoDelta ACKs: When a GeoDelta can have been applied at a remote DC_Cluster, it can respond to the datacenter that sent the GeoDelta (OriginDC_Cluster) with an AckGeoDelta. An example flow of an AckGeoDelta is now illustrated:

In a first step remote DC_Clusters (e.g. DC_Cluster_2) ACK the GeoDelta. In a second step the OriginDC_Cluster for the delta (e.g. DC_1) can sum the number of Geo-ACKs and when the number can be equal to the total number of DC_Clusters in the DataNet. The delta can have been globally ACKed and the KeyMaster can send a GeoCommitDelta to remote DC_Clusters and a CommitSubscriberDelta to locally connected subscribers (including the author or the delta). In a third step remote DC_Clusters can receive the GeoCommitDelta and send CommitSubscriberDeltas to locally connected subscribers. When a subscriber receives a CommitSubscriberDelta it removes the corresponding SubscriberDelta (or AgentDelta) and the Delta can have been eradicated.

Example Details of VCR

On initialization each agent can be assigned a globally unique universally unique identifier (UUID) (or other identifier) from its data center (e.g. can be referred to as the AgentUUID). An agent can modify a document, a globally unique identifier (ID) for the delta can be created by combining a per-key unique AgentVersion with the AgentUUID to form the globally unique delta_ID: [AgentUUID, KeyName, AgentVersion] tuple. This delta with its globally unique delta_ID can be sent to this agent's DC_Cluster where it (either directly or indirectly via other DC_Clusters) can be sent to Subscribers of this delta's channel(s).

The delta can be then applied (i.e. a new document reflecting the delta can be saved) at DC_Clusters and subscribers. The delta may not yet be removed from any of the players: AuthoringAgent, DC_Clusters, or Subscribers. When the agent's DC_Cluster can send the delta to other DC_Clusters, it may then wait on ACKs from these DC_Clusters. Once the agent's DC_Cluster have received delta_ACKs from other DC_Clusters, it issues a GeoCommitDelta to DC_Clusters (including itself). When a DC_Cluster receives a GeoCommitDelta, it can send a CommitDelta to various locally connected subscribers (including the AuthoringAgent) of this delta's channels. When a subscriber receives a CommitDelta, it can remove the delta. This can be the end of the lifetime a delta (e.g. on a device) and the entire flow can ensure a delta is removed when numerous dependencies (e.g. ACKs from data centers) successfully complete.

Various failure events (DC_Cluster-failures, cluster node-failures, DB-failures) can result in the agent's DC_Cluster not receiving ACKs from other DC_Clusters. These failures can result in no GeoCommitDelta being sent and the delta can remain on every player it was sent to. DC_Clusters and subscribers can have heartbeats that check for deltas older than an allowed threshold. When a DC_ClusterHeartbeat detects a delta older than the allowed threshold (e.g. OLD_delta), it can retransmit the delta as a GeoDelta to other data centers. When a Subscriber_Heartbeat detects an OLD_delta, it can retransmit the delta to its data center as a SyncDelta (e.g. where it can be then transmitted to other data centers as a GeoDelta). Each DC_Cluster and subscriber can maintain a map of which deltas have previously been applied (e.g. using the globally unique delta_ID). Each DC_Cluster and subscriber can also ensure that each delta they receive (and subsequently process) from a given AgentUUID is sequentially in a specified order before applying the delta. Deltas from other agents must be applied in a causally consistent manner to be correct. An out-of-order or repeat-delta with respect to AgentUUID cannot be applied at the data center or subscriber. These mechanisms suffice to yield the apply-only-once of single error correction (SEC).

The datanet can apply deltas from a given agent in a sequential order. The datanet can allow for an arbitrary order of application with respect to deltas across agents (e.g. Deltas from agent1 can be applied in order: [A1-1, A1-2, A1-3] but Deltas across agents 1 and 2 can be applied in any order: both [A1-1, A2-1, A2-2, A1-2, A1-3, A2-3] and [A2-1, A2-2, A2-3, A1-1, A1-2, A1-3] are acceptable).

Viral commutative technology can retransmit any delta (e.g. which can have not been globally ACKed) once it has crossed the 'old' threshold. This ensures that once a DC_Cluster and/or subscriber may have received a delta; it can attempt to have the delta applied globally forever. This also means once a DC_Cluster or subscriber can have applied a delta when it considers the delta as 'live'. The delta can then eventually be applied globally and can be already locally visible. This is one method of how VCR can achieve a global low latency replication—allowing deltas to be live before they have been ACKed. In VCR, a delta can be live after the first phase of its two-phase-commit. A difference between an AgentDelta and a SyncDelta can be the receiver of the SyncDelta does not assume the sender of the delta to be the AuthoringAgent. A SyncDelta can be sent throughout the system just like an AgentDelta. This can be implemented first to a connected DC_Cluster, then to other DC_Clusters, then to subscribers.

Out-of-Synchronization Documents Examples

Documents can become out-of-synchronization in several example scenarios. The datanet can have methods to reset an out-of-synchronization document without losing data. These document-resets may more expensive than normal deltas (e.g. in terms of processing bandwidth, etc.), but represent a smart tradeoff. They cover a myriad of out-of-synchronization conditions and this approach avoids storing the large volume of deltas that are not immediately applied at all of their intended subscribers. Hence, they can be made to fix out-of-synchronization documents. Documents may have an out-of-synchronization state (e.g. When an agent or data-center goes offline for a period of time). When an agent or datacenter comes back online, the document may have missed an n-number of deltas. The solution to re-synchronize the document can be the same for both the agent and the datacenter.

AgentOnline calls and DataCenterOnline call responses can notify the agent and datacenter when keys are out-of-synchronization (ToSyncKeys). The agent can call Need-Merges (e.g. to its connected data center) for each ToSyncKey which can be responded to with a SubscriberMerge. The datacenter calls GeoNeedMerge (to any full synced DC) for each ToSyncKey which can be responded to with a DataCenterMerge. Both SubscriberMerges and DataCenterMerges contain the FULL state of a document, which includes: CRDT, AgentVersions, and Ether (see Appendix A of U.S. Provisional Patent Application No. 62/135,164 filed on 19 Mar. 2015, this provisional patent application is incorporated by reference herein in its entirety). The state of the document can be then persist at the agent and/or datacenter and normal delta-based-replication can resume.

The 'Ether' elements in a SubscriberMerge can be used by an Agent to update the garbage-collection-version of any Delta it has authored or detect that the Delta is stale, before sending the Delta to its DC. This optimization can ensure a minimal amount of staleness enters into the Datanet when an Agent comes back online. Any Agent that detects a Stale Delta on DC-reconnect will locally ignore (i.e. not apply) the stale delta.

Example Geodistributed Garbage-Collection

In some examples, the datanet's CRDT Arrays do not directly delete array-members. Instead the operation of deleting an array-member generates a tombstone. These tombstones can merge in concurrent operations that reference (e.g. via LeftHandNeighbor (LHN) relations, etc.) the deleted array-member. Periodic garbage collection can remove these tombstones, preventing the document from growing unbounded in size. Garbage collection can be triggered when the number of tombstones in a document exceeds a threshold. Garbage collection can be accomplished via a specialized Delta generated by the PrimaryDataCenter (e.g. elected during GeoClusterVote). A Delta (e.g. with array deletions in it) which causes the (post-delta-application) document to have more tombstones than a threshold can be referred to as a GarbageCollection (GC)-triggering-Delta. The PrimaryDataCenter can send a GC-Delta immediately after it processes a GC-Deltas.

Exemplary Garbage-Collection-Triggering-Delta

GC-Deltas can be generated by the PrimaryDataCenter to avoid duplicate GC-Deltas. During GeoCluster-ReOrgs, when the PrimaryDataCenter can be down zero, GC-Deltas can be sent until a new PrimaryDataCenter is elected during a GeoClusterVote. Accordingly, garbage collection can be delayed during a GeoClusterReOrg, but can resume afterwards. The GC-Delta can be authored by the PrimaryDataCenter. After creation, the GC-Delta can be sent throughout the datanet in the manner of a 'normal' Delta. The GC-Delta can contain no data. Rather it can include a directive to perform GarbageCollection upon application. When any datanet player (e.g. including the PrimaryDataCenter) applies a GC-Delta, it increments the LocalCRDT-GarbageCollectionVersion. Given the concurrent nature of the datanet and its asynchronous replication style, GarbageCollectionVersion mismatches may happen for a short period of time after the GC-Delta can be sent (e.g. any Delta created while the GC-Delta can be in transit can be one GarbageCollectionVersion behind). The datanet can have mechanisms in place that: 1.) detect GarbageCollectionVersion mismatches; 2.) upon a GarbageCollectionVersion mismatch, ask the PrimaryDataCenter delta for an augmented delta (called ReorderDelta); 3.) apply the ReorderDelta with the desired GarbageCollectionVersion to the GarbageCollectionVersion-out-of-order Delta to updates its GarbageCollectionVersion. ReorderDeltas are deltas are explained in detail in section 178

Advanced Data Structure Deltas

The list of current advanced data structures that the datanet supports can be CAPPED-LIST, ORDERED-UST, and SCOREBOARD. The advanced data structures may use re-sorting upon modification. This can be carried out by every player in an independent manner (e.g. without neither coordination nor shared-state can be required (e.g. the rules are enforced functionally)). CAPPED-LISTs can use periodic trimming. Periodic trimming can be accomplished by an extra datacenter generated a delta (e.g. named DS_delta). CAPPED-LISTs can be arrays with arguments: MAX-SIZE and TRIM. When the array has more than MAX-SIZE elements in it, it can be trimmed to contain elements (e.g. MAX-SIZE minus TRIM). A DS_delta can implement this trimming. DS_deltas are similar to GC_deltas in that they are generated by the PrimaryDataCenter (e.g. as opposed to agents).

The OS_delta can be authored by the PrimaryDataCenter and after creation can be sent throughout the datanet like a normal Delta. The DS_delta contains operations to enforce the Advanced DataStructure's rules (e.g. trim X arrayelements).

Example Shared Document Sections

The datanet can support sharing sections of documents between different documents. Any datanet document can share any of its sections with any other documents, respecting permissions. A section can be defined as any JSONobject (including a document's root-level). To share a DocumentSection, a document (e.g. with KeyX) can use the keyword '_share:[KeyA,KeyB]' at the root level of a DocumentSection. This DocumentSection can then be shared with the TargetDocuments KeyA and KeyB, meaning modifications to this DocumentSection can be replicated to the TargetDocuments. A user modifying a SharedDocumentSection can also write privileges to the TargetDocuments (KeyA and KeyB) for successful sharing. DocumentSection sharing can propagate in a tree-like hierarchy. A modification done at the leaf-level (e.g. KeyX) of a SharedDocumentSection can be propagated up the tree to its parent(s) (e.g. KeyA, KeyB). A modification done at the parent-level (e.g. KeyA) can be propagated down the tree to its children (e.g. KeyX).

Sharing DocumentSections can be utilized for various use-cases, first use cases are: aggregating data from the leaves of a tree up to its root-level and composing a single RootDocument out of a plurality of sub-pieces. These can both be tree-like sharing hierarchies. Aggregating data from the leaves of a multi-level tree up to the root can be used for use-cases such as aggregating data in an election. Leaf-documents can be individual voters in the election, the parents of the tree's leaves can be aggregations at the county level, whose parents can be aggregations at the state level, and finally the root of the tree can be aggregations at the national level. Individual voters (the leaves) can record their votes in a SharedDocumentSection that can be automatically aggregated at county, state, and national levels.

Using SharedDocumentSections to compose a single document from a plurality of sub-pieces can be useful as an optimization for any document that can be modified by many (e.g. >100) subscribers. Documents can store metadata (e.g. DeltaIDs) for each subscriber who has modified the document. When the number of subscribers modifying a document crosses a threshold (e.g. 100), it can be recommended to split the document up into sub-pieces. Each sub-piece can be modified by no more than the threshold's number of subscribers and each sub-piece shares the same section with the RootDocument. Further, subscribers can write to their SubPieceSharedDocument and read from the RootSharedDocument. The RootSharedDocument can be modified exclusively by SharedDeltas (not by AgentDeltas) and can contain metadata for the authors of these SharedDeltas, which can be the number of datacenters. As the number of datacenters can be a smaller number than the number of subscribers, this optimization can reduce the metadata size of each document in this SubPieceSharedDocuments plus RootSharedDocument hierarchy.

An example SharedDocumentSection Delta-Flow description is now provided. Agents can modify SharedDocumentSections and create 'normal' AgentDeltas. These AgentDeltas can be sent to the agent's datacenter which then sends GeoDeltas to other datacenters. These AgentDeltas (and/or resulting GeoDeltas) can generate SharedDeltas at each datacenter. SharedDeltas can be separate Deltas from the AgentDelta. SharedDeltas can copy the part of the AgentDelta modifying a SharedDocumentSection. The SharedDeltas can then be applied to TargetDocuments (e.g. KeyA and KeyB from the example above). A single AgentDelta can generate number-of-SharedDocumentSectionsmodified times number-of-TargetDocuments-per-SharedDocumentSection SharedDeltas at each datacenter. SharedDeltas can be generated by each datacenter on AgentDelta or GeoDelta reception, SharedDeltas are not geo-replicated (e.g. no GeoDeltas generated from SharedDeltas), and SharedDeltas are sent to local subscribers (e.g. do generate SubscriberDeltas from SharedDeltas). Further, AgentDeltas being re-sent to a new datacenter (e.g. due to AgentDataCenterFailover) can contain metadata specifying they are re-sends. Datacenters receiving re-sent AgentDeltas which can generate SharedDeltas and send SubscriberMerges, instead of SubscriberDeltas, to local subscribers, as the subscriber's state (e.g. with respect to the TargetDocuments) can be undetermined. These properties of SharedDeltas (e.g. generated at EACH datacenter on AgentDelta/GeoDelta, no GeoDeltas produced but SubscriberDeltas produced, send SubscriberMerge on ResendAgentDeltas) can satisfy SharedDocumentSection's requirements (e.g. SharedDeltas-generated-by-datacenter and apply-onlyonce). It is noted that a SharedDelta flow can represent a more efficient flow in terms of size of metadata stored on subscribers per document. This example flow may be used in the datanet for implementing deltas.

Primary Datacenter Triggers Garbage-Collection

Another method of GeoDistributed GarbageCollection is now provided. The Datanet's CRDT arrays may not delete array-members directly, instead the operation of deleting an array-member generates a tombstone. These tombstones can enable merging in concurrent operations that reference (via LeftHandNeighbor relations) deleted array-members. Periodic GarbageCollection removes these tombstones, preventing the Document from (over time) growing unbounded in size. GarbageCollection is triggered when the number of tombstones in a Document exceeds a threshold. GarbageCollection is accomplished via a specialized delta generated by the PrimaryDataCenter (elected during GeoClusterVote).

A delta (with array deletions in it) which causes the (post-Delta-application) Document to have more tombstones than a threshold is referred to as a GCTriggeringDelta. The PrimaryDataCenter can send a GC-Delta immediately after it processes a GCTriggeringDelta. GC-Deltas are generated SOLELY by the PrimaryDataCenter to avoid duplicate GC-Deltas. During GeoCluster-ReOrgs when the PrimaryDataCenter is down no GC-Deltas can be sent until a new PrimaryDataCenter has been elected (via a GeoClusterVote). This means GC can be delayed system-wide during a GeoClusterReOrg, but can resume immediately after GeoClusterReOrg has completed.

A GC-Delta is authored by the PrimaryDataCenter and after creation is sent throughout the Datanet as a normal delta. A GC-Delta contains no data, rather it contains metadata about which tombstones should be archived and which neighboring array elements should have their LeftHandNeighbors reordered to fill the hole created by the garbage-collected element. The metadata in a GC-Delta consists of: [tombstone_summaries, lhn_reorders, undo_lhn_reorders]. When a DC receives a GC-Delta it can archive all tombstones in the tombstone_summary[ ] (removing the tombstones from the CRDT), reorder any element's LeftHandNeighbor in the lhn_reorders[ ], and then save all three members of the GC-Delta's metadata to the DB as a GarbageCollectionVersionSummary (GCVSummary).

Tombstone_summaries[ ] describe which tombstones are to be permanently deleted. ONLY these tombstones can be deleted on GC-Delta application Lhn_reorders[ ] describe the reordering of LeftHandNeighbors that happens when the tombstones in tombstone_summaries[ ] are permanently removed from the CRDT. Permanently removed tombstones assign their LeftHandNeighbors to any member in the array whose LeftHandNeighbor matches the removed tombstone. Receiving DCs can apply the lhn_reorders[ ]. Undo_lhn_reorders[ ] store the BEFORE state of an LHN_reordering and are used to reverse (undo) an LHN_reordering. This undo is needed in the FreshenDelta algorithm (explained later).

When any Datanet player (including the PrimaryDataCenter) applies a GC-Delta it increments its LocalCRDT's GarbageCollectionVersion (GCV). Deltas applied to Documents' with differing garbage collection versions (GCVs) need to be 'freshened' before application, to ensure LeftHandNeighbor consistency within the CRDT. Freshening a delta is done by using the GCV-Summaries spanning the delta's (lower) GCV to the Document's (higher) GCV to recreate the state spanning the delta's state to the Document's state. When a ClusterNode receives an AgentDelta with a lower GCV, it can merge ALL GCV-Summaries and use the aggregate tombstone_summaries[ ] and undo_lhn_reorders[ ] to build a logical bridge between the delta and the Document. This logical bridge is used to create a new delta with the Document's GCV, which can be applied.

GCV-Summaries build up over time and must be periodically reaped (permanently deleted), to keep the DB lean. This brings up the case where a delta GCV is older than the earliest saved GCV-Summary. This scenario is referred to as a StaleDelta. StaleDeltas are detected during AgentDelta reception. Stale AgentDeltas are marked as IGNORE by the ClusterNode, all DCs and Subscribers receiving a Delta marked as IGNORE ignore the delta. The Agent issuing a Stale AgentDelta is forced to resynchronize this key's document from his DC.

GeoDeltas arriving at DataCenters do not check GCVs, they are simply applied. In error conditions, GeoDeltas may arrive late. The logic that positions elements in an array is contained within the GC-Deltas' metadata. In severe error conditions, a GC-Delta may arrive BEFORE the delta adding the element garbage collected by the GC-Delta.

Latecoming GeoDeltas (usually due to error conditions) sometimes have LHN references to members no longer present in the remote DataCenter's CRDT. These references are valid and can be corrected by subsequent GC-Delta's LHN_reorderings. CRDTs can become inconsistent betwixt DataCenters (e.g. a remote ClusterNode dies, the remote Cluster reorganizes, meanwhile the CRDT at the remote Cluster is many deltas behind all other Datacenters' CRDTs). To synchronize CRDTs in these cases all missing deltas from up-to-date DataCenters are sent in a single RPC call (e.g. GeoDentries) to the out-of-date remote DataCenter. The GeoDentries call can update the remote DataCenter (with respect to the sending DataCenter) atomically. The GeoDentries call can also solve the problem of out-of-date GeoDeltas, as the out-of-date GeoDeltas are cleaned up by subsequent deltas all contained in the atomic GeoDentries call. Since all deltas within the GeoDentries call can be applied as a single unit, the CRDT is never visibly in an inconsistent state.

Base Data Structures

The following are the Datanet's base data structures, they consist of CRDT types and operations. Types of data structures can include, inter alia: object, array, number, and string. Observed/Modify means an Agent can only modify or delete an [object, array, number, string] it has observed it, in other words if the [object, array, number, string] is in its current scope. When an [object, array, number, string] is modified that no longer exists (overwritten or deleted) the modification becomes a NO-OP when it is applied. An object can include a LastWriterWins (LWW) Register. Objects can be key-value pairs. The value can be a [object, array, number, string]. Datanet objects themselves are simply containers for Key-Value pairs, so they can only be set, overwritten, or deleted and are therefore Registers. A Document's root is an object.

A number can be a PN-Counter. Numbers are represented as Positive/Negative counters, meaning there are separate monotonically growing counter for increments(P) and decrements(N). Setting a number can create a new version of the number and set only P or N (depending on whether the set-value is positive or negative) and a set follows LWW conflict resolution. A string can be LWW Register. Strings are simply registers, the only operations permitted on strings are set and delete. Set creates a new version of the string. LWW determines the winner of competing string sets.

An array can be a LeftHandNeighbor defined position and garbage collected Tombstones arrays have by far the most complicated implementation. Arrays use the LeftHandNeighbor relationship to define array position. An array with the elements ['A', 'B', 'C'] would have the following LeftHandNeighborMap:{'A'→null,'B'→'A','C'→'B'}.

The LeftHandNeighbor relationship allows concurrent inserts into the middle of the array, ties are broken via timestamps. Deleting array member's tombstones these members, they still exist, but are not displayed. Tombstones can pile up and cause Documents to grow unacceptably large, so GarbageCollection of array Tombstones is required (explained in section #6: 'Garbage Collection'). The LeftHandNeighbor relationship does not define a classical reverse direction linked list, but rather a hybrid tree/linked-list data structure. Concurrent adds into the middle of an array can result in two elements with the same LeftHandNeighbor. These two elements may also be the roots of LeftHandNeighbors chains. This is where the data-structure exhibits tree-like properties: the two (2) elements with the same LeftHandNeighbor can be sorted (to timestamp) and the final array can display the first element, followed by its LeftHandNeighbor chain, followed by the second element and its LeftHandNeighbor chain. The evaluation of the tree to the final array is done by a simple left-first depth-first recursive function.

Given the following LeftHandNeighbor relationships: [B→A, C→A, D→B, E→D, F→C] the algorithm can define the element A (which has no LeftHandNeighbors) as the array root and then search for element with A as their LeftHandNeighbor, finding B and C, which are sorted to timestamp, (e.g. resulting in order C, B). From there elements with C and B can be searched for, creating their chains. The final ordering of the array can be [A, C, F, B, D, E] which can be read as [A,[C, F],[B, D, E]] or [Root, Chain(C), Chain(B)].

Various descriptions of example operations are now provided. A set (ALL types) operation can enable all types to be set. A set can create a new version of the type. Following Observed/Modify principles this means, any operations to the previous version of the type are now treated as NO-Ops. A delete (ALL types) can be provided.

ALL types can be deleted. Deletion of objects, object-members, or arrays can simply remove the object, object-member, or array. Deletion of array-members can create a tombstone within the array. An insert (array only) operation can be provided. An API can be provided to insert an array position value. Inserting values into a position in an array is possible via the 'insert' operation. An increment/decrement (number only) operation can be provided. Numbers can be incremented and decremented. These operations can modify the number's P or N counter values, respectively.

Additional Example Data Flow Illustrations

Figure 2:
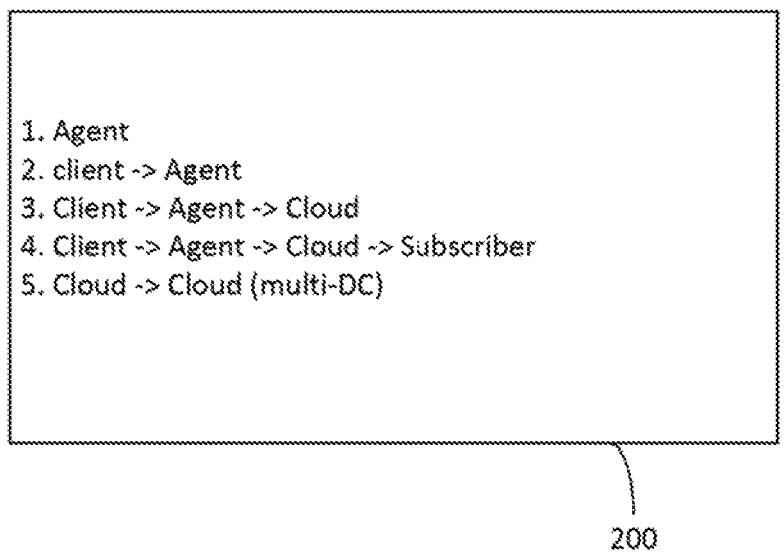
FIG. 2 illustrates a list of additional example data-flow architectures that can be implemented within a datanet system, according to some embodiments.

FIG. 2 illustrates a list 200 of additional example data-flow architectures that can be implemented within a datanet system, according to some embodiments. Example data-flow architectures include, inter alia: agents, client→agent, client→agent→cloud, client→agent→cloud→subscriber, and cloud→cloud (e.g. multi-data centers).

Figure 3:
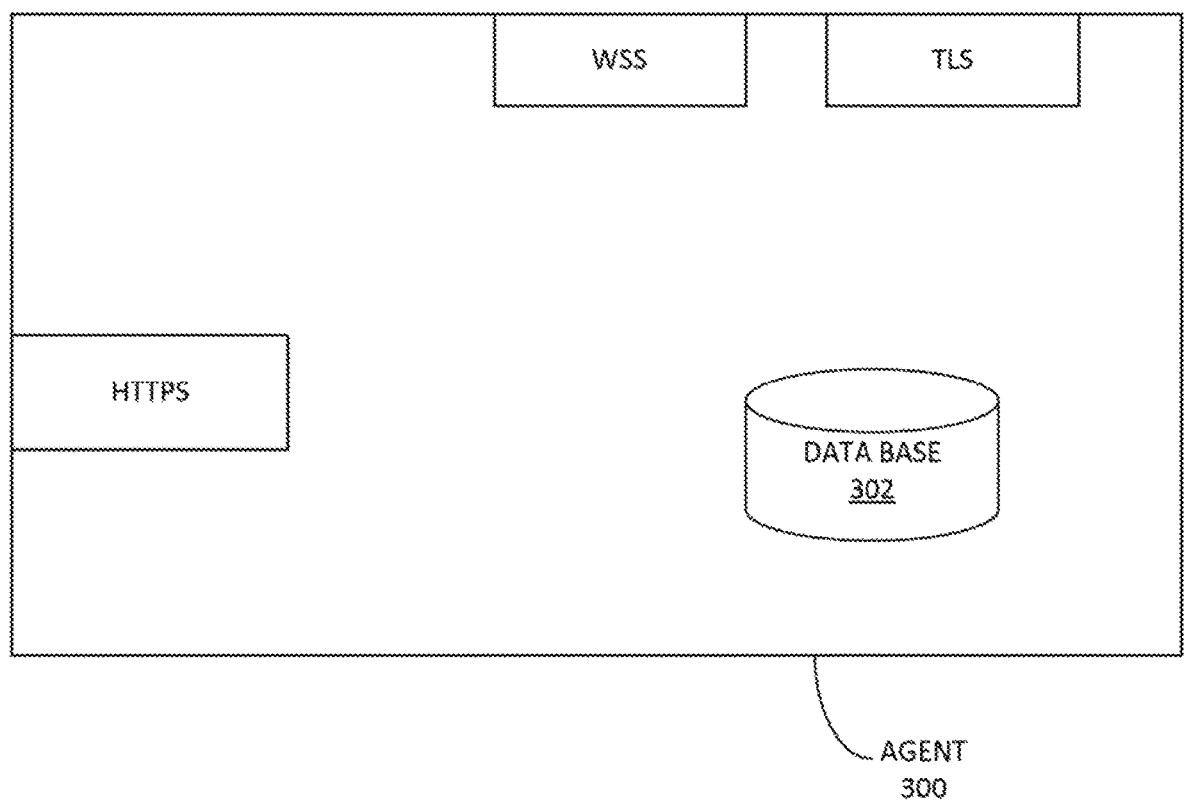
FIG. 3 depicts, in block diagram format, an example agent architecture, according to some embodiments.

FIG. 3 depicts, in block diagram format, an example agent 300 (e.g. agent supra) architecture, according to some embodiments. In a datanet system, agent 300 can reside on either an application server, in a web browser tab and/or embedded in a mobile application. Agent 300 can include database 302. Agent 302 can include various interfaces (e.g. a Hypertext Transfer Protocol (HTTP) (and/or HTTP secure (HTTPS)) interface, a WSS interface, and a TLS interface). Client 400 (e.g. Application-server client(s)) can communicate to an associated and/or dedicated agent via HTTPS. In another example, client(s) 400 (e.g. Web browser and/or mobile-application clients) can make function calls to their in-process agent(s) 300. Client 400 can propagate data to agent 300. Agent 400 can store the data in the agent's localhost database 302.

Figure 4:
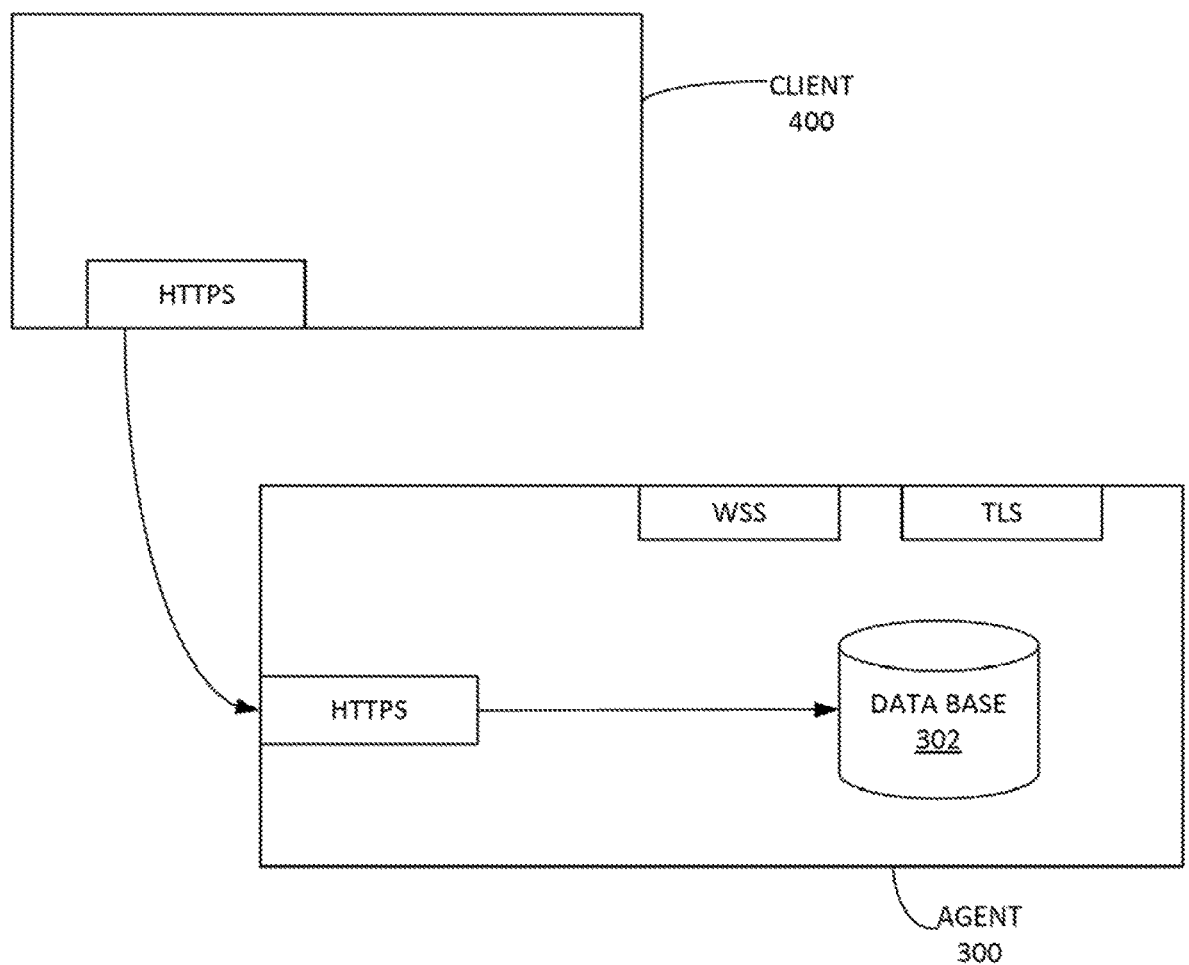
FIG. 4 depicts, in block diagram format, an example client→agent→cloud data-flow architecture, according to some embodiments.

FIG. 4 depicts, in block diagram format, an example client→agent→cloud data-flow architecture, according to some embodiments. Agent 300 can forward client data to a cluster (e.g. a cloud-based cluster). A cluster can include one or more cluster node(s) 500. Agent 400 can store the data in the agent's localhost database 302. Agent 400 can utilize a TLS interface to propagate the data to a TLS interface of cluster node 500. Cluster node 500 can store the data in the node's localhost database 502.

Figure 5A:
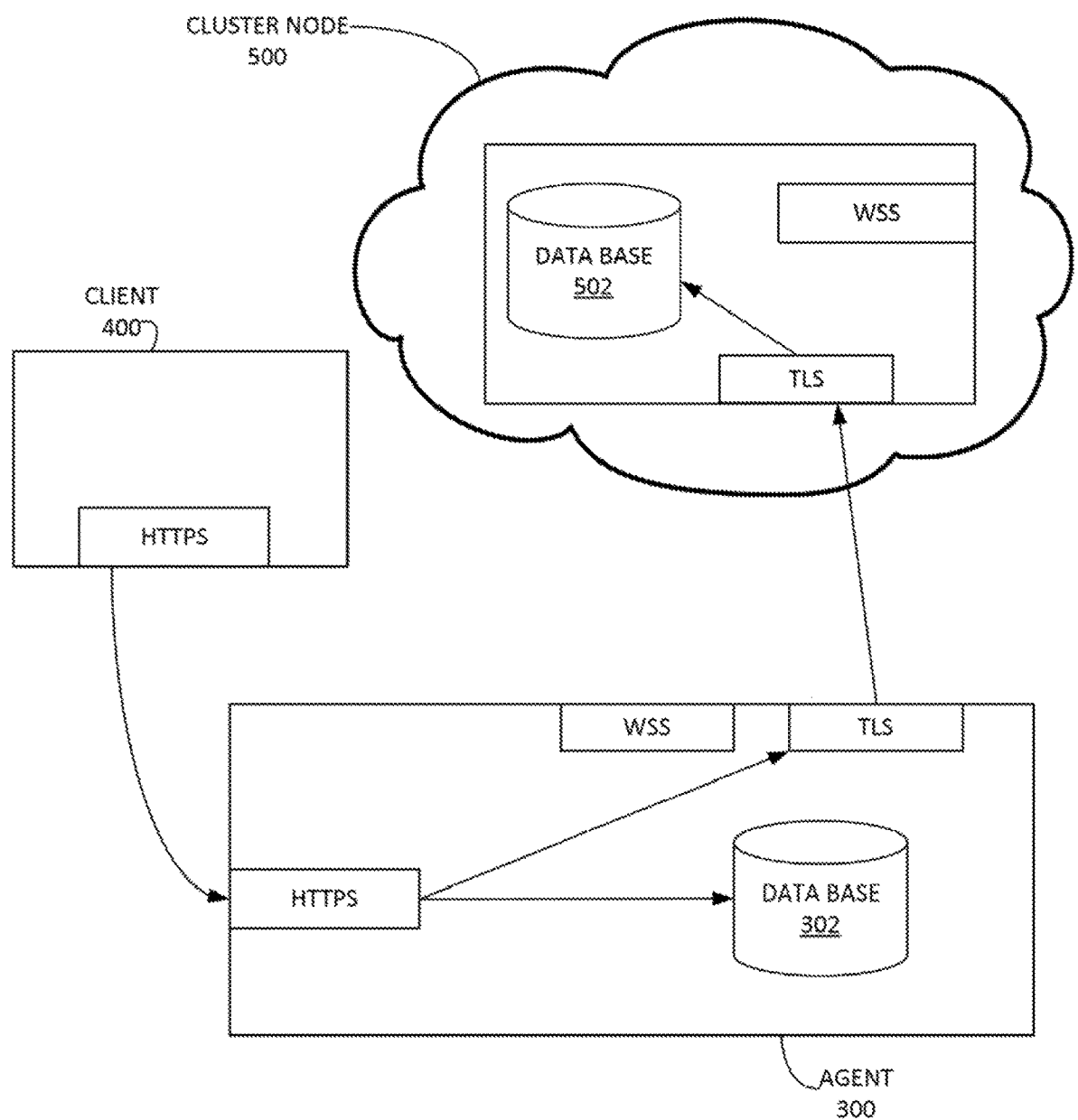
FIG. 5 A-B depict, in block diagram format, an example architecture of a plurality of cloud-cluster nodes, according to some embodiments.
Figure 5B:
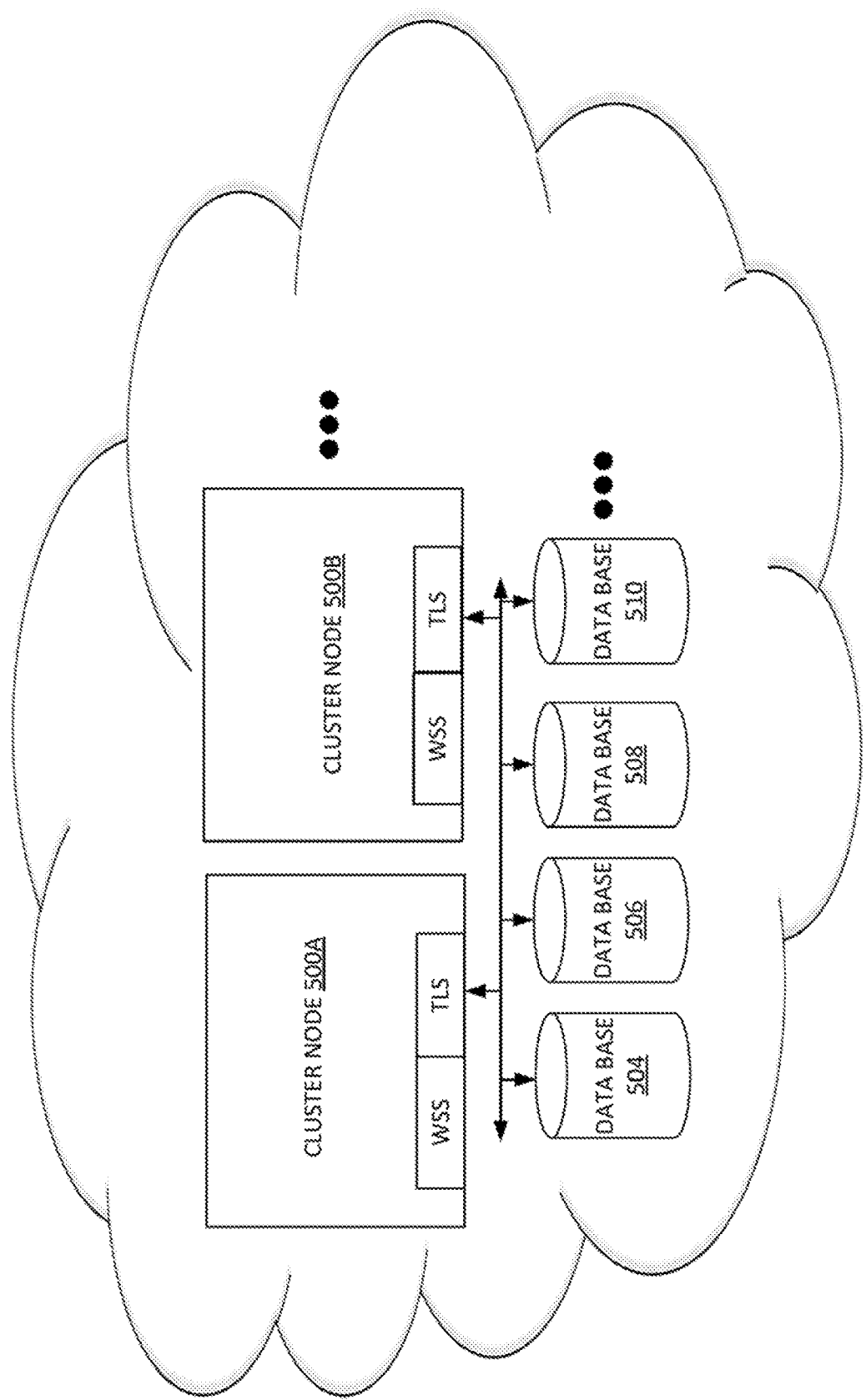

FIG. 5 depicts, in block diagram format, an example architecture of a plurality of cloud-cluster nodes, according to some embodiments. Cloud-cluster nodes 500 A-N can be implemented in one or more cloud-computing platforms. Cloud-cluster nodes 500 A-N can include the same communication interfaces as the cluster nodes discussed supra. However, in some examples, Cloud-cluster nodes 500 A-N can utilize remote databases (e.g. Databases 504-510). Databases 504-510 can also be implemented in one or more cloud-computing platforms.

Figure 6:
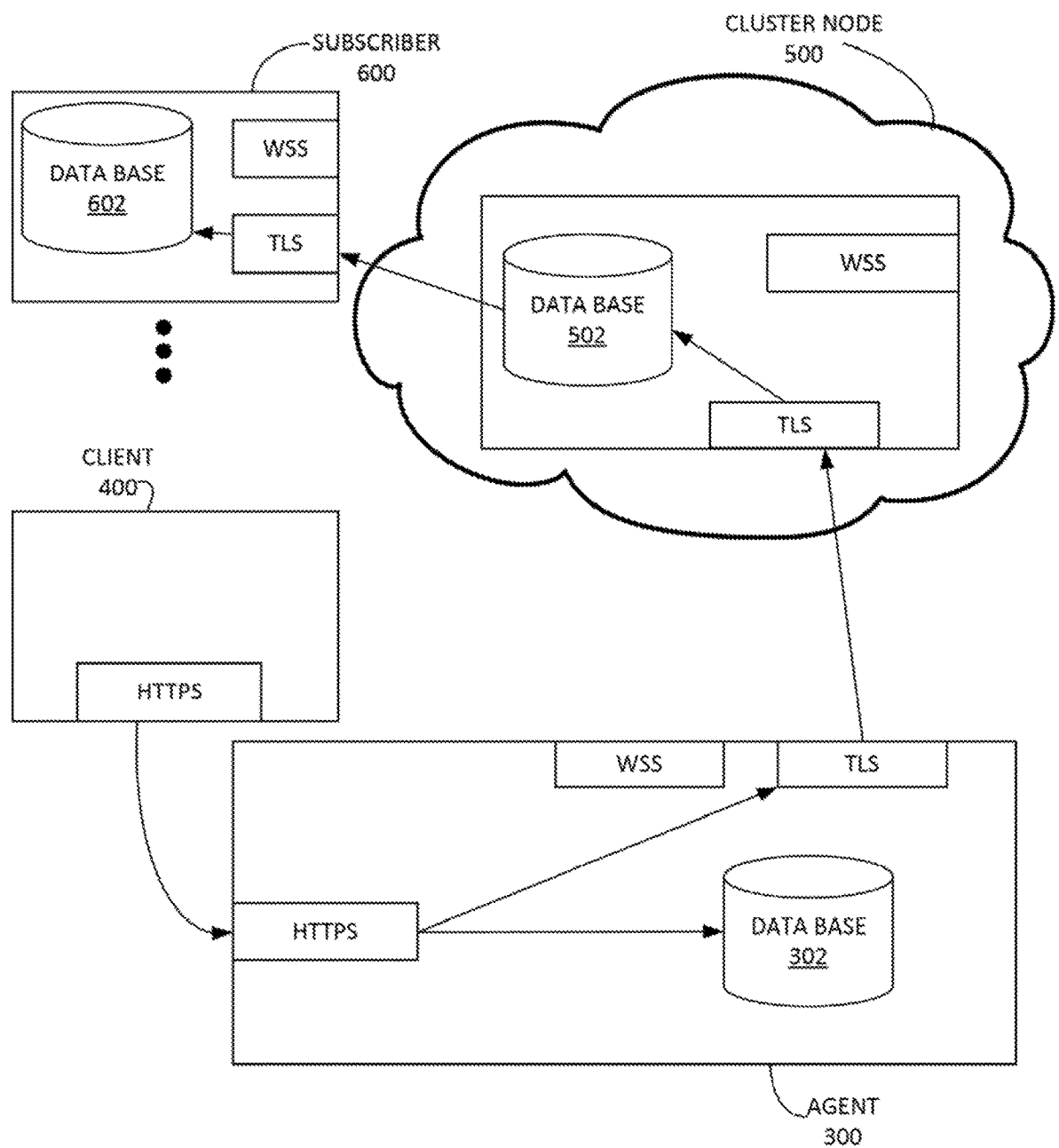
FIG. 6 depicts, in block diagram format, an example client→agent→cloud→subscriber architecture, according to some embodiments.

FIG. 6 depicts, in block diagram format, an example client→agent→cloud→subscriber architecture, according to some embodiments. The client, agent and cluster components of FIG. 6 can be implemented as provided supra in FIGS. 2-5. The cloud-based cluster node 500 can forward the client's data to subscriber(s) 600. Subscriber 600 can include various communication interfaces (e.g. as shown) and database 602. The system of FIG. 6 can also be utilized to implement an example client→agent→cloud→plurality of subscriber's architecture as well. In this example, cloud-based cluster node 500 can forward the client's data to a plurality of subscriber(s).

Figure 7:
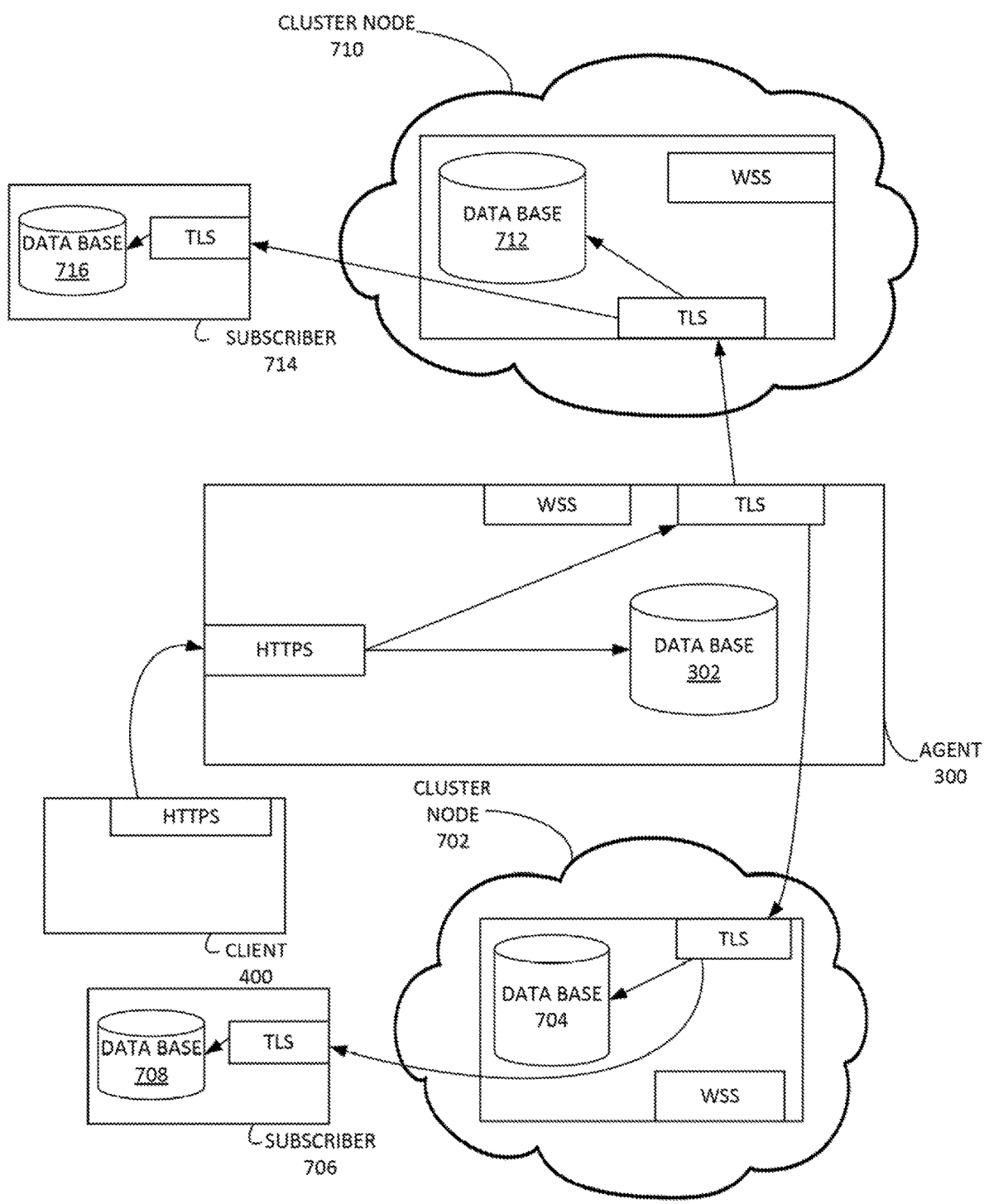
FIG. 7 depicts, in block diagram format, an example client→agent→clouds→subscriber architecture, according to some embodiments.

FIG. 7 depicts, in block diagram format, an example client→agent→clouds→subscriber architecture, according to some embodiments. The client, agent and cluster components of FIG. 7 can be implemented as provided supra in FIGS. 2-6. The cloud-based cluster nodes 500 and 702 can forward the client's data to subscriber(s) 600 and 706.

Figure 8:
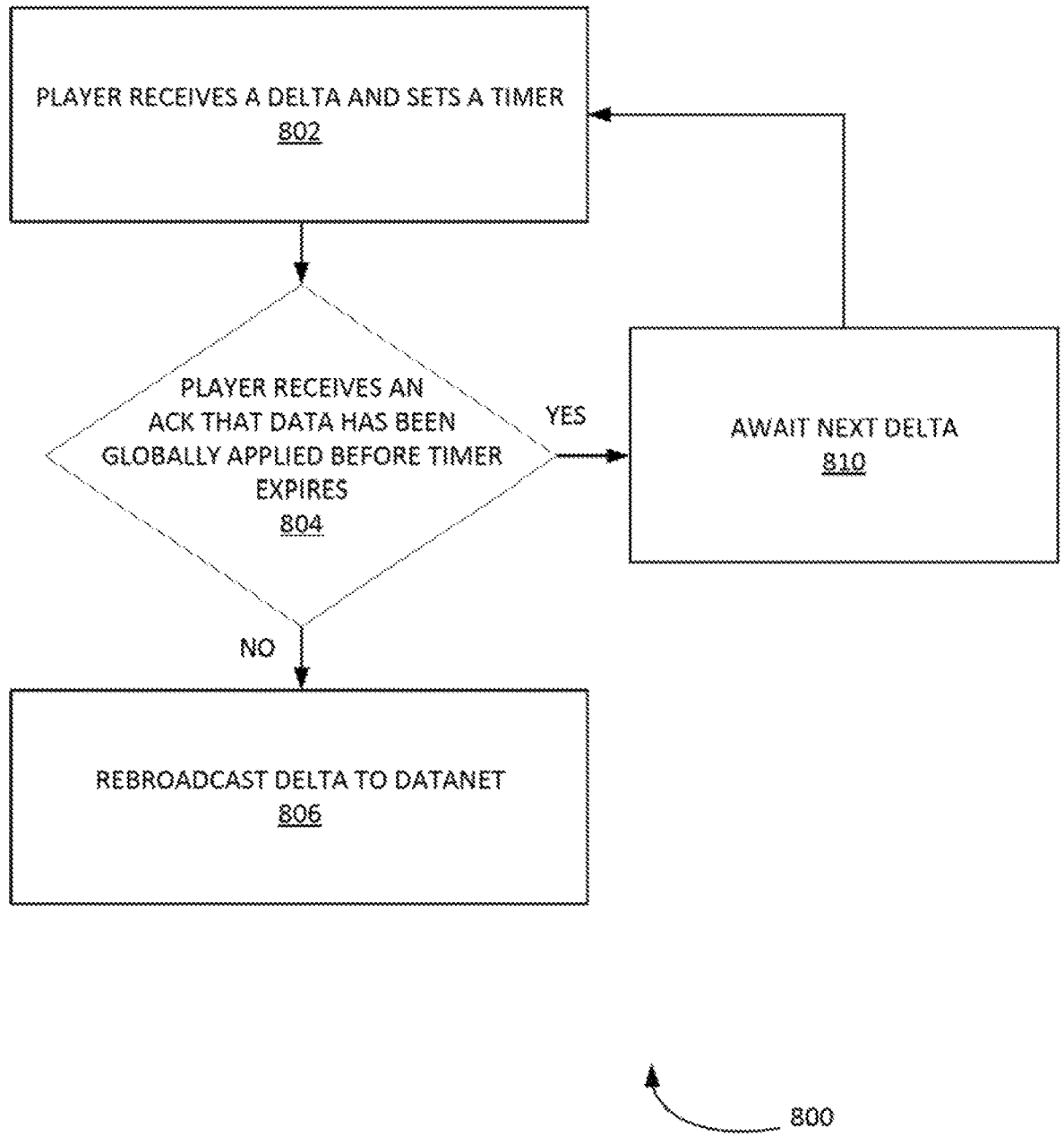
FIG. 8 illustrates an example process of a player rebroadcasting a delta in a datacenter, according to some embodiments.

FIG. 8 illustrates an example process 800 of a player rebroadcasting a delta in a datacenter, according to some embodiments. In step 802, a player can receive a delta. In step 804, it can be determined if the player received receives an ACK that the delta has been globally applied (e.g. applied by all other players interested in the delta). For example, the player may not have received a second phase of a commit that tells them to delete the delta. For example, the player may have been temporally offline and not have received the appropriate ACK. If 'yes', the player can proceed to step 810. In step 810, the player can await the next delta to apply. The delta is not rebroadcast back into the datanet (e.g. after a certain threshold of time). In 'no', the player can proceed to 806. In step 806, the player can rebroadcast the delta to the datanet (e.g. to other interested players in the datanet). So if a player receives a delta then loses the connection to local datacenter the player may not receive the ACK. The player can then reconnect to a datacenter (e.g. another datacenter), the delta can then be reapplied globally after a threshold of time.

Extensive versioning (e.g. assigning unique version names or numbers to unique states of the data) can be implemented by the entities of the datanet. For example, each player (e.g. a device and/or data center) can have various versions for a key. For example, each document can have a key (e.g. can identify origin of the data), device unique id (device ownership), key version, etc. A key can be represented as a matrix that is on each entity of the datanet architecture. Versioning can be used to ensure that a data write (e.g. a delta) is only applied once at a given destination.

Figure 9:
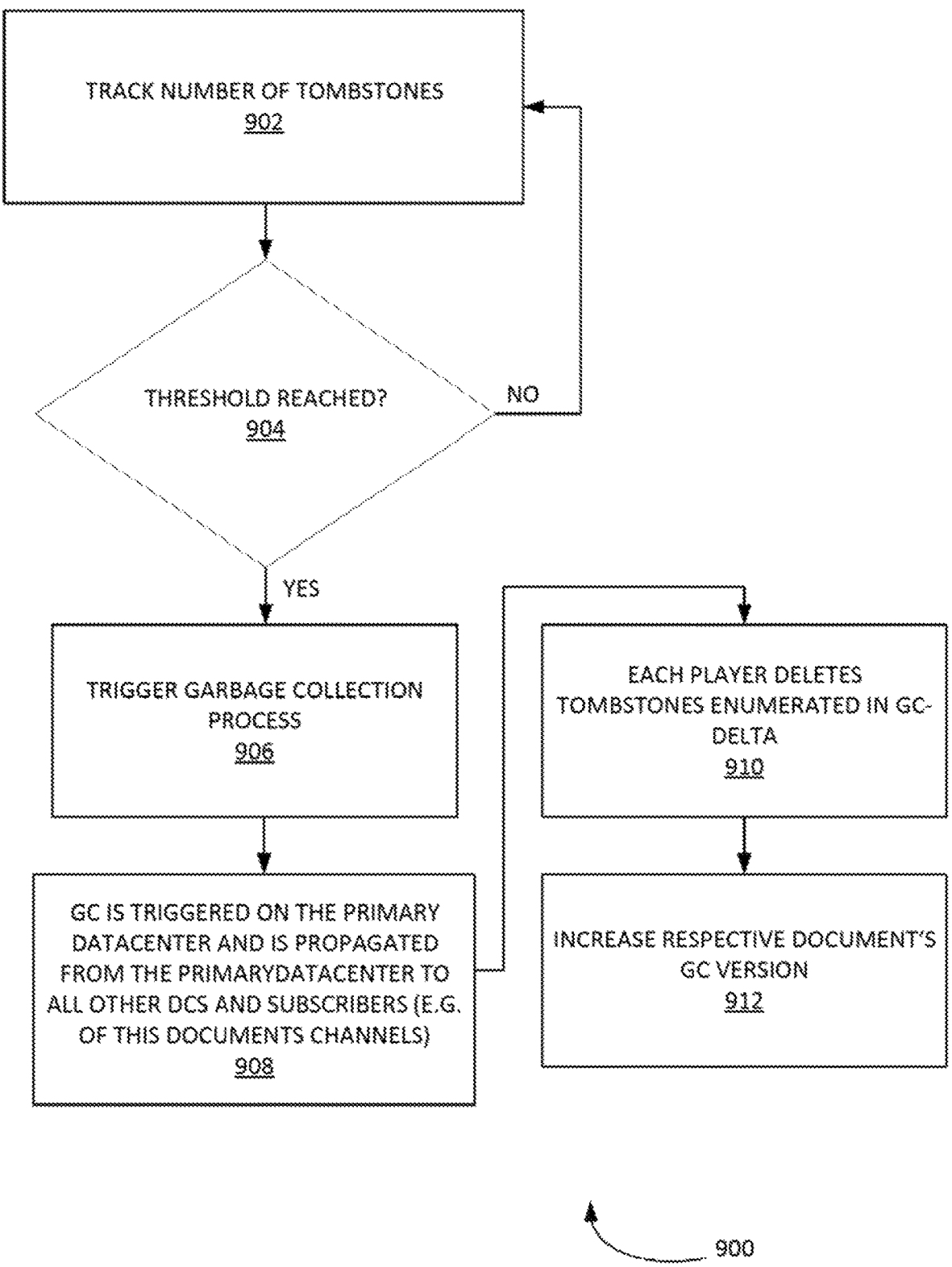
FIG. 9 illustrates an example process of garbage collection tombstones in a datanet, according to some embodiments.

FIG. 9 illustrates an example process 900 of garbage collection tombstones in a datanet, according to some embodiments. The deletion of arrays can produce tombstones. A tombstone can be a sign in a replica that Information has been deleted. Accordingly, tombstones can accumulate and grow unbounded. Process 900 can be utilized as a GC process to delete said tombstones. In step 902 the number of tombstones (e.g. for each array, for each document, etc.) can be tracked by each player in the datanet. In one embodiment, GC process can remove tombstones from a document and update GC versioning to document. In step 904, it can be determined if a threshold has been reached. If 'no' then process 900 can continue to track the number of tombstones. If 'yes', then a GC process can be triggered in step 906. Steps 908-912 illustrate an example tombstone GC process. In step 908, the deletes are sent to a data center (DC) and then propagated globally to other DCs in datanet (e.g. and to other devices connected with the datanet). It is noted, that in one example, the GC process can be triggered at a single initial datanet entity in order to maintain a single GC version. The delta that triggers the GC can be propagated to all other relevant DCs. In this way, the GC can be triggered from a single DC. In one example, a geo-cluster (e.g. use of multiple redundant computing resources located in different geographical locations to form what appears to be a single highly-available system) of DC's form a geo clusters can perform an election to elect a primary DC. The primary DC can manage tombstone GC and versioning. This primary DC can generate a GC delta that is propagate to all relevant players (e.g. including the player that that originated the delete that caused threshold be reached). In step 910, each player then receives the GC delta and can then delete all the tombstones. It is noted, that whenever GC is performed, process 900 increases a GC version in step 912. Each document has a GC version for race condition management.

Figure 10:
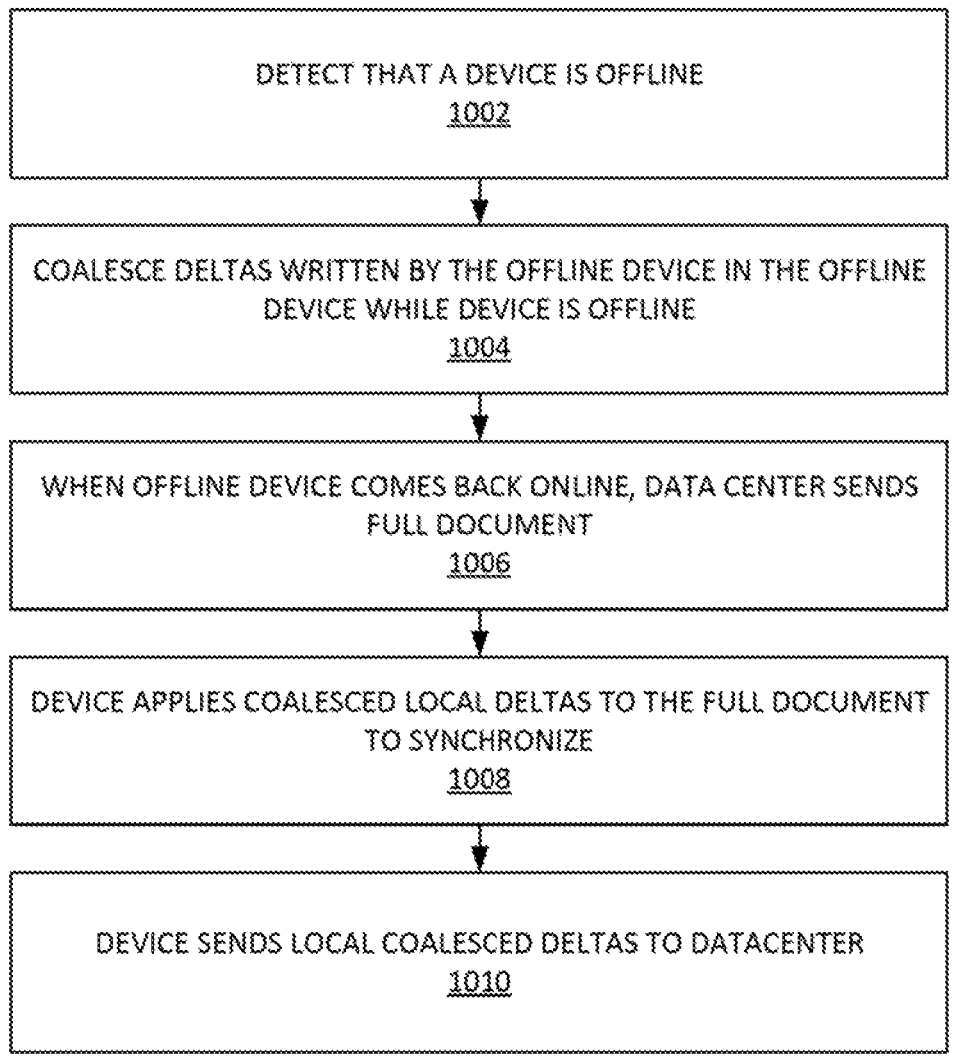
FIG. 10 illustrates an example process of data synchronization for temporarily offline-devices in a datanet, according to some embodiments.

A device can go offline. During the offline period, the device can continue writing deltas. Moreover, various deltas can be addressed to the device that the device may fail to receive. It may infeasible to store all of these deltas addressed to the device on the DC-side bound for the offline-device. The offline device can store these deltas that the offline device is writing. FIG. 10 illustrates an example process 1000 of data synchronization for temporarily offline-devices in a datanet, according to some embodiments. In step 1002, it can be detected that a device has gone offline. In step 1004, all the deltas written by the offline device can be coalesced. The device can then come back online. In step 1006, the DC can send its version of the full document to the device instead of a set of deltas to apply to the device's version of the document. In step 1008, the device can apply the coalesced deltas to the full document to synchronize. A new version of the document can then be generated and propagated in the datanet.

Exemplary Use Cases

Exemplary use cases of various contexts that the methods and systems provided herein are now provided. In one example, a datanet can be utilized to globally synchronize game-state data for multiple-player perspective (MPP) games between users in substantially real-time. In another example, applications can synchronize data between users' different devices (e.g. tablet computers, smart phones, wearable computing devices (iWatch®), personal computers, etc.). IoT devices can persist data as it is generated. The IoT devices can then connect the data at a later time. Application servers can utilize fully synchronized localhost database (at substantially zero latency). A datanet can be utilized to build a substantially lossless ultra-robust extreme-low-latency cross-platform data-synchronized system. A datanet can be used to provide global presence and/or multiple DCs in a single country in order to improve user experience (e.g. due to reduced latencies). A datanet can provide lossless data synchronization when IoT devices come back online after a period of time offline.

In another example, a DC can go offline for a period of time. When the DC comes backline, it can perform a synchronization. The DC synchronization can determine what documents that were changed while it was offline. The DC can request full document synchronizations from the other DCs with the changed documents. Unlike the case of the offline device, the DC may not generate its own deltas. Accordingly, the DC may not need to apply its own deltas to the received full documents.

Additional Computer Systems and Architecture

Figure 11:
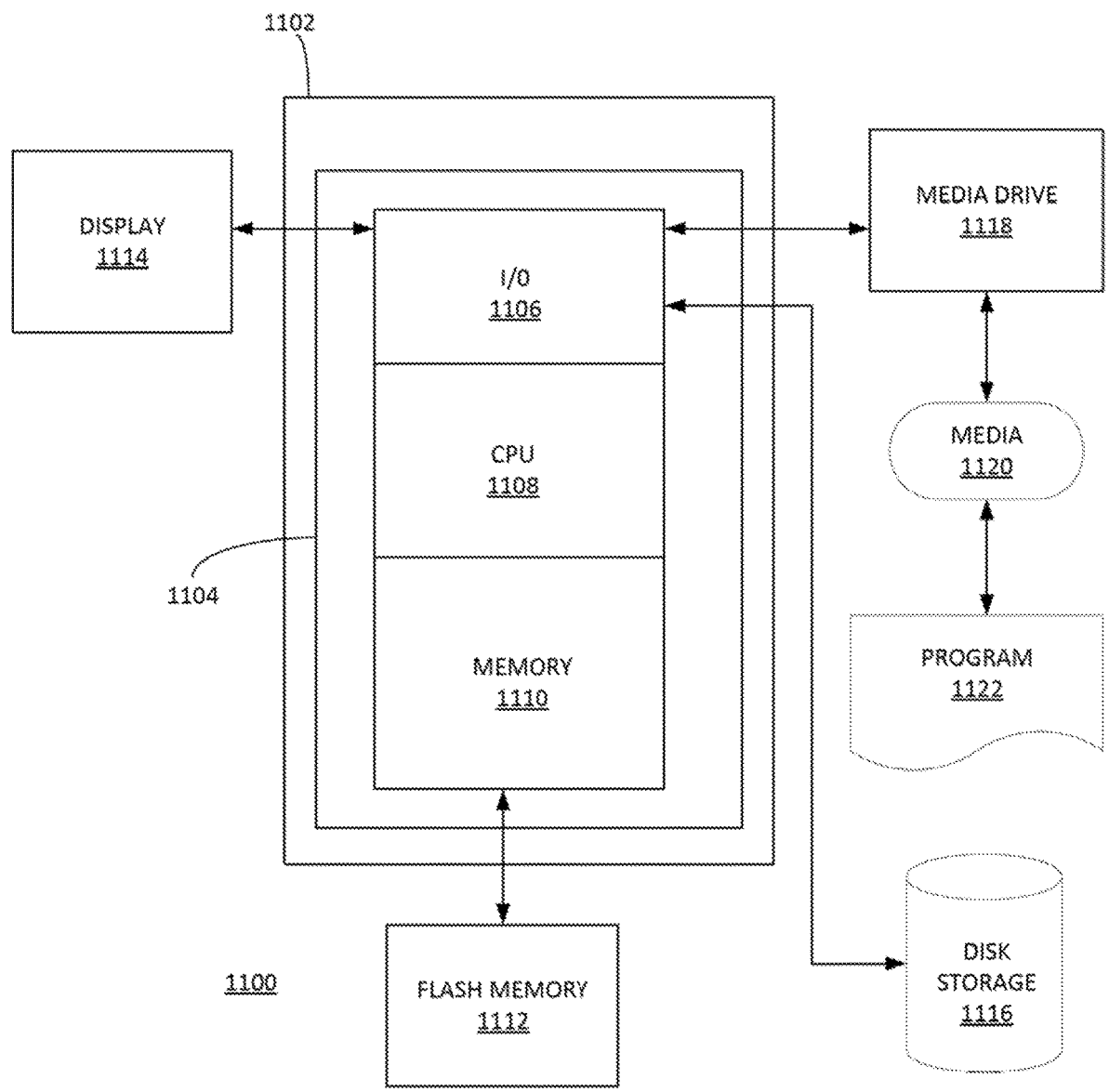
FIG. 11 depicts computing system with a number of components that may be used to perform any of the processes described herein.

FIG. 11 depicts an exemplary computing system 1100 that can be configured to perform any one of the processes provided herein. In this context, computing system 1100 may include, for example, a processor, memory, storage, and I/O devices (e.g. monitor, keyboard, disk drive, Internet connection, etc.). However, computing system 1100 may include circuitry or other specialized hardware for carrying out some or all aspects of the processes. In some operational settings, computing system 1100 may be configured as a system that includes one or more units, each of which is configured to carry out some aspects of the processes either in software, hardware, or some combination thereof.

FIG. 11 depicts computing system 1100 with a number of components that may be used to perform any of the processes described herein. The main system 1102 includes a motherboard 1104 having an I/O section 1106, one or more central processing units (CPU) 1108, and a memory section 1110, which may have a flash memory card 1112 related to it. The I/O section 1106 can be connected to a display 1114, a keyboard and/or other user input (not shown), a disk storage unit 1116, and a media drive unit 1118. The media drive unit 1118 can read/write a computer-readable medium 1120, which can contain programs 1122 and/or data. Computing system 1100 can include a web browser. Moreover, it is noted that computing system 1100 can be configured to include additional systems in order to fulfill various functionalities. Computing system 1100 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Additional Process Flows of CRDT Arrays in a Datanet

It is noted that in some examples, a datanet can be a highly distributed data synchronization platform. A datanet can utilize CRDT-based technologies to allow many masters to modify data concurrently and/or without coordination. A datanet can support various CRDT data-structures (e.g. numbers, strings, dictionaries, etc.) as well as arrays and/or other complex data-structures. A datanet can be comprised of multiple datacenters (DC) and a set of (e.g. up to billions, etc.) of agents. A datanet's multiple DCs can communicate (e.g. 'gossip') with one another, form geo-clusters, and/or elect a primary data center. Individual DCs can contain multiple nodes which communicate (e.g. 'gossip'), form a datacenter-cluster, and function collectively as a single distributed database.

Agents can reside as embedded libraries, stand-alone binaries in browsers, mobile-apps, Internet-of-Things applications, and/or application-server-caches. Agents typically function as write-able/replicating caches, containing a small subset of a datanet's total data. Each Agent can be connected to a single DC. Both DC-databases and/or agent-databases can have full master privileges (e.g. they can both write and replicate data Both DC-databases and/or agent-databases can provide causal consistency through vector clock versioning systems.

CRDT arrays (e.g. a 'CRDT') can use a distributed GarbageCollection (GC). GC can be implemented via a GC-versioning system. Replication can begin at an agent. At an agent, a data-delta (e.g. a 'delta') can be sent from an agent to its DC. The DC can then forward the delta to other DCs (e.g. all other DCs). The other DCs can, in turn, forward the delta to other agents (e.g. subscribers) that cache the key. Each DC can track agents caching a key (e.g. all agents caching a key). Neither causal consistency nor GC-version checks may be done during replication. Instead, this can be implemented at every end-point, and thus, allow replication to flow quasi P2P at one-way packet transmission latency (e.g. based on the following sequence: AgentX→DC1→DC2→SubscriberY). Subscribers receiving replicated deltas can apply them (e.g. via CRDT algorithms) to their local copy of the key. This can achieve a highly distributed strong-eventual-consistency (SEC) system where each DB-master can write and/or replicate data without coordinating with other masters.

An example of the structure of a CRDT in a datanet is now provided. CRDTs can contain a metadata section and a data section. A CRDT's metadata section can contain various datanet-related information (e.g. document-creation, agent-versions, GC-versions, etc.). A CRDT's data section can contain the data for a given key. Every data element in a CRDT can be uniquely specified/versioned/addressable by a tuple.

A CRDT array can implement various operations. For example, a CRDT array can insert a new element and specify which element it will come after (e.g. in a highly distributed environment). A CRDT array can automatically deal with conflicts when two elements specify they will come after the same element.

Figure 12:
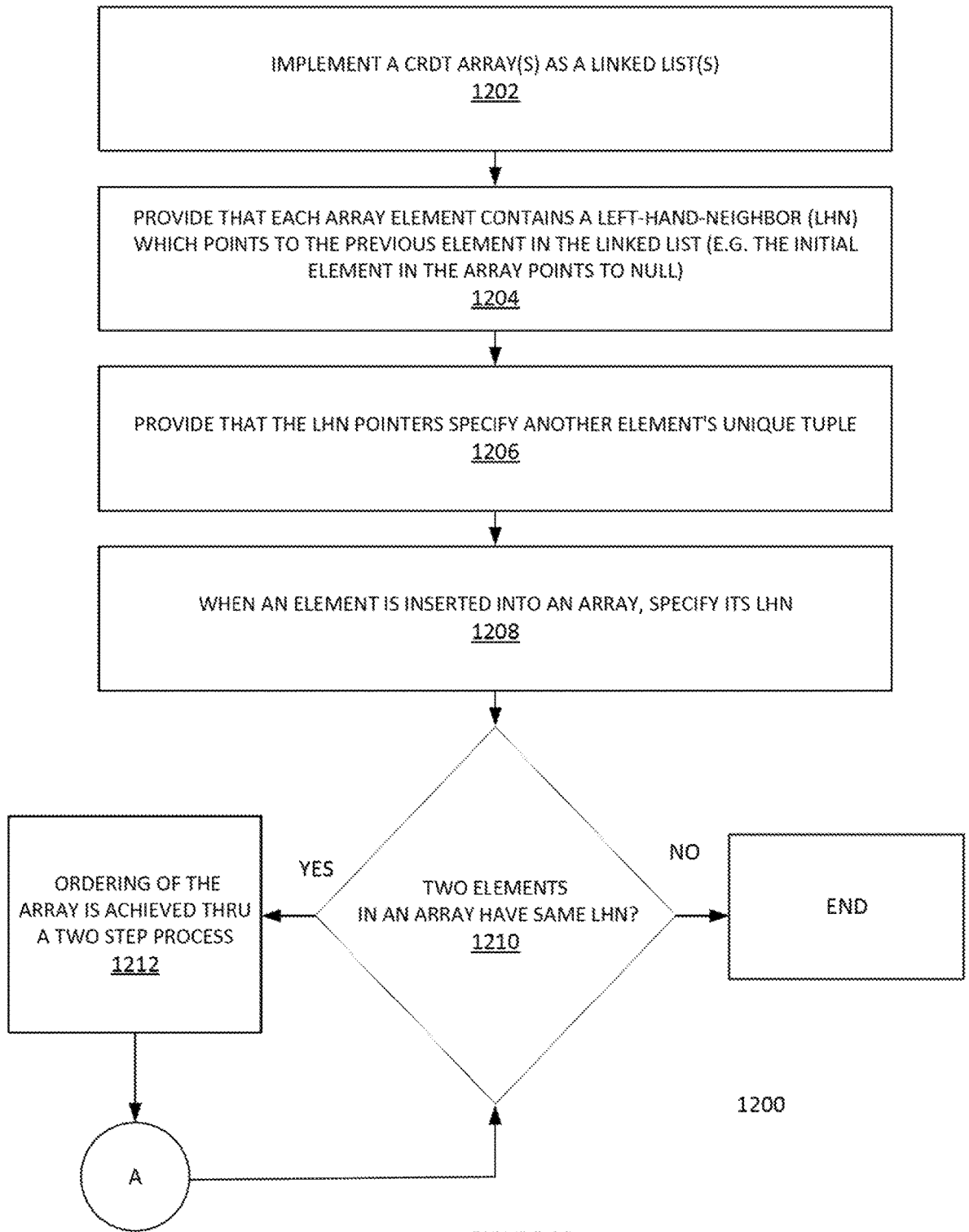
FIG. 12 depicts an example process for implementing CRDT arrays in a datanet, according to some embodiments.

FIG. 12 depicts an example process 1200 for implementing CRDT arrays in a datanet, according to some embodiments. In step 1202, a CRDT array(s) is implemented as a linked list(s). In step 1204, process 1200 provides that each array element contains a left-hand-neighbor (LHN) which points to the previous element in the linked list (e.g. the initial element in the ARRAY points to NULL). In step 1206, process 1200 provides that the LHN pointers specify another element's unique tuple. In step 1208, when an element is inserted into an array process 1200, specify its LHN. In step 1210, it is determined whether two elements in an array have same LHN? If 'yes', then process 1200 ordering of the array is achieved thru a CRDT array ordering process (e.g. see process 1300 of FIG. 13 infra, etc.) in step 1210. If 'no' then process 1200 can end.

Figure 13:
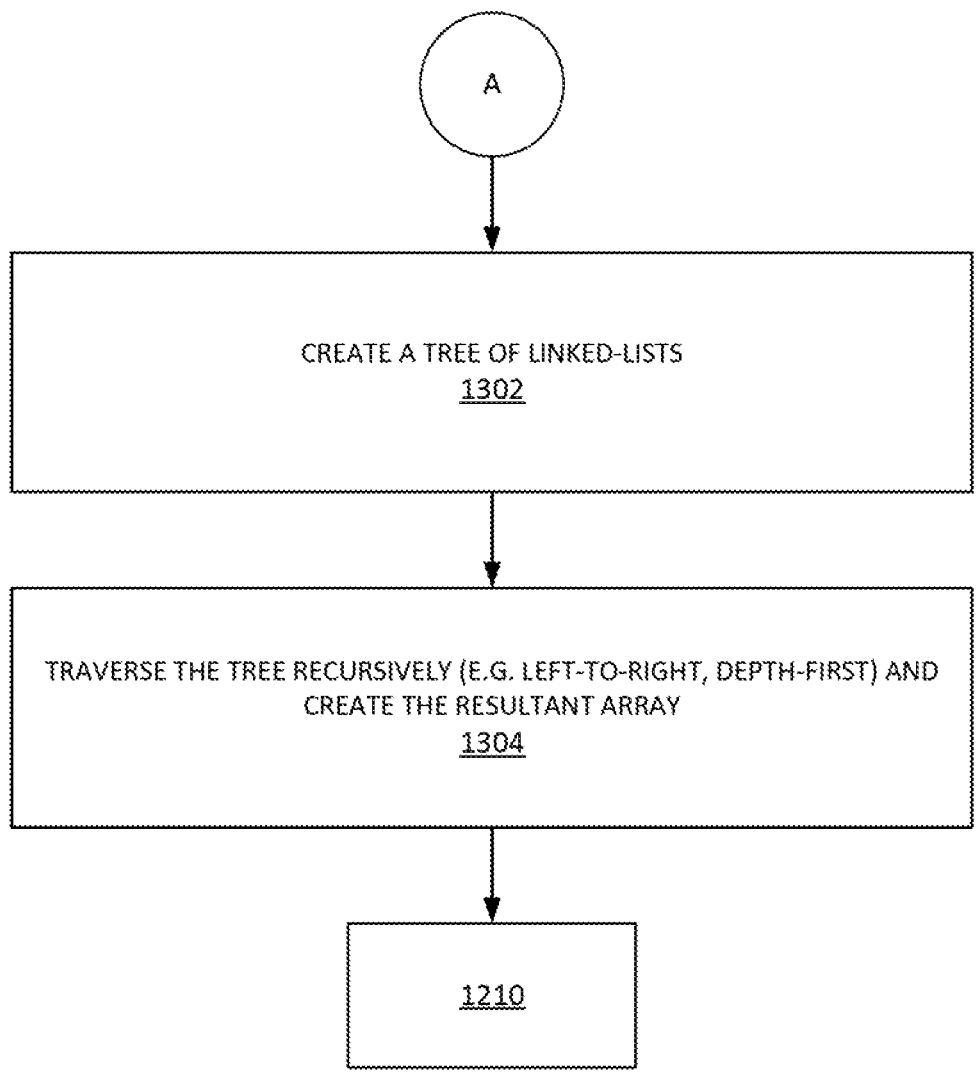
FIG. 13 illustrates an example process for ordering a CRDT array, according to some embodiments.

FIG. 13 illustrates an example process 1300 for ordering a CRDT array, according to some embodiments. In step 1302, process 1300 can create a tree of linked lists. In step 1304, process 1300 can traverse the tree recursively (e.g. left-to-right, depth-first) and create the resultant CRDT array.

Figure 14:
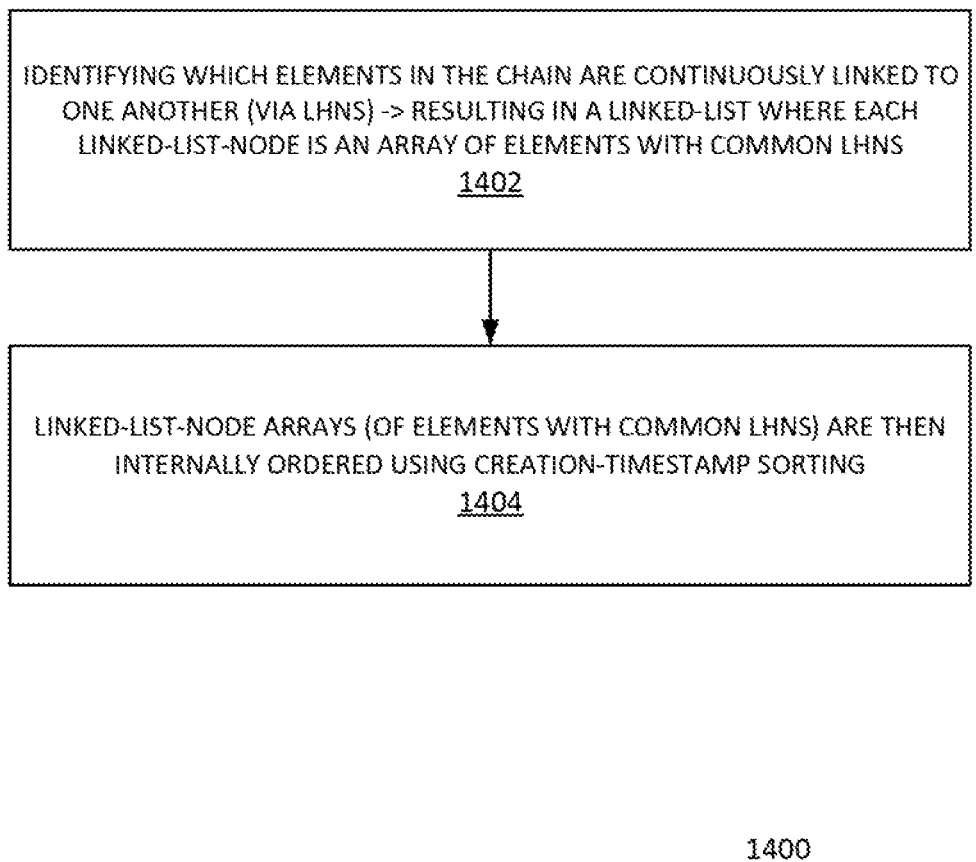
FIG. 14 illustrates an example process for creating a tree of linked-lists, according to some embodiments.

FIG. 14 illustrates an example process 1400 for creating a tree of linked-lists, according to some embodiments. In step 1402, process 1400 can identify which elements in the chain are continuously linked to one another (e.g. via LHNs)→resulting in a linked-list where each linked-list-node is an array of elements with common LHNs. In step 1404, linked-list-node arrays (e.g. of elements with common LHNs) are then internally ordered by process 1400 using creation-timestamp sorting.

FIG. 15 illustrates an example list 1500 of elements in a CRDT array, according to some embodiments. List 1500 can include an authoring agent and/or creation-timestamp.

Figure 16:
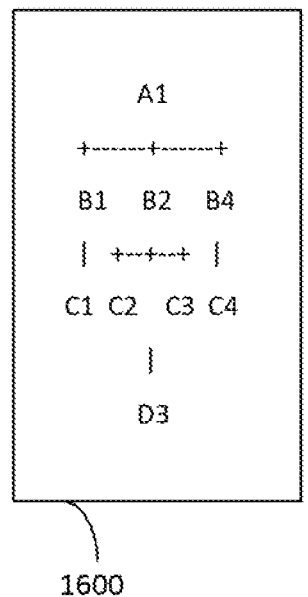
FIG. 16 illustrates an example tree of sorted CRDT array elements, according to some embodiments.

FIG. 16 illustrates an example tree 1600 of sorted CRDT array elements (e.g. as sorted by processes 1200 and 1300 supra), according to some embodiments. Process 1600 can sort the CRDT array elements into the tree 1600 (e.g. a linked-list of arrays). It is noted that [B1,B2,B4] can be sorted based on creation-timestamp. It is noted that [C2,C3] can be sorted to creation-timestamp. Tree 1600 can then be traversed using a left-to-right depth-first algorithm, to create the array: [A1,B1,C1,B2,C2,C3,D3,B4,C4]. It is noted that the linked-list nature of the final data-structure is illustrated in tree 1600. For example, D3 is added at TS:6, chronologically later than B4 at TS:4, but D3 can come before B4 in the CRDT array.

A process of implementing DB-tombstones in a CRDT array is now provided. Each CRDT-Array deletion does not delete elements but rather create DB-tombstones (e.g. due to the distributed nature of a Datanet's architecture, etc.). Tombstones may not be visible when reading a key. Tombstones can be used as positional metadata during agent-side delta generation and/or subscriber-side delta application.

Figure 17:
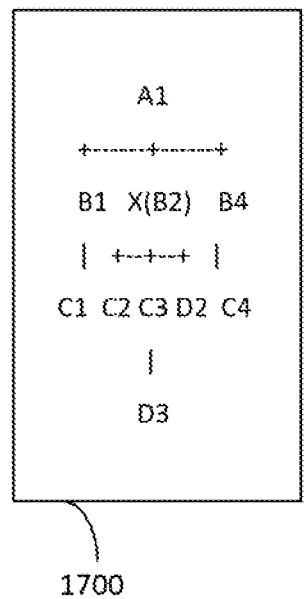
FIG. 17 illustrates an example tree, according to some embodiments.

Returning the example of FIGS. 15 and 16, FIG. 17 illustrates an example tree 1700, according to some embodiments. More specifically, FIG. 17 shows tree 1700 after both a delete(B2) operation and/or Insert(D2,LHN(B2)) operation. Using the array from FIGS. 15 and 16, if the element B2 were deleted, the array can become [A1,B1,C1,X(B2), C2,C3,D3,B4,C4] where X( ) represents a tombstone. Two agents may be modifying the array concurrently. For example, Agent1 can deletes 82 and/or Agent2 inserts D2 with LHN(B2). Since a tombstone preserves the positional metadata for 82, the Delta from Agent2 inserting D2 after B2 can be inserted in the correct position. It is noted that [B1,X(B2),B4] can be sorted based on creation-timestamp. It is noted that [C2,C3,D2] can be sorted based on creation-timestamp. This can result in the array: [A1,B1,C1,X(B2), C2,C3,D3,D2,B4,C4].

A process of implementing distributed garbage collection (GC) in a CRDT array is now provided. Tombstones can accumulate over time. Accordingly, tombstones can eventually take up too much space and/or need to be garbage collected. Since DCs and agents have different storage capabilities, each can employ various GC strategies.

DC-level GC can be managed by the PrimaryDC (e.g. elected during GeoCluster formation). The PrimaryDC issues a GC-Delta when the number of tombstones in a key passes a given threshold. GC-Deltas instruct DCs to remove specified tombstones from a key and store these tombstones as a GC-Summary. Agents can receive GC-Deltas can also remove the tombstones from the key, but are not required to store the GC-Summary.

GC-Summaries can be utilized to create positional metadata bridges between deltas of differing GC-versions. For example, if an agent sends a delta w/GC-version 5 and PrimaryDC's current GC-version is eight (8), a positional metadata bridge can be created by adding the positional metadata from GC-Summaries[5,6,7] to the CRDT to which the delta is being applied. A CRDT that has positional metadata added to it can be equivalent to a CRDT that never performed garbage collection. For example, the requisite positional metadata is guaranteed to be present (e.g. with respect to GC-versions). With a sufficient positional bridge, the PrimaryDC can apply the delta w/correct positioning. The PrimaryDC can also summarize the reordering needed to adjust the delta so that it can be applied with positional correctness on subscribers. This summary can be sent in a PrimaryDC generated ReorderDelta. It can be sent to other DCs (e.g. all other DCs) and/or interested subscribers. It is noted that subscribers may not be able to create the positional bridge (e.g. due to missing GC-Summaries) needed to apply an Out-of-GC-Version-Order-Delta correctly. Therefore, a ReorderDelta can be insert elements with positional correctness.

Garbage collection of tombstones can remove positional data from the CRDT. If a delta is received by a subscriber with array LHNs that have been garbage collected, the subscriber may not apply the delta and assure positional correctness. Accordingly, the PrimaryDC can issue a ReorderDelta for any delta containing a GC-version less than the PrimaryDC's current GC-version. ReorderDeltas can instruct subscribers how to apply this Out-of-GC-Version-Order-Delta by supplying missing positional metadata. Once the corresponding ReorderDelta is applied to the Out-of-GC-Version-Order-Delta, positional correctness can then be assured.

An example process of distributed garbage collection reaping is now discussed. Agents may not be required to store GC-Summaries, so they are free to not store GC-Summaries. Another option for agents is to store one (1) GC-Summary per key and additionally do LRU eviction system-wide on GC-Summaries. Storing a single GC-Summary per key enables the subscriber itself to create a positional metadata bridge when it receives a delta that is one GC-version behind (which is the most common Out-of-GC-Version-Order-Delta case).

At the DC level, GC-Summaries can accumulate over time. The PrImaryDC drives GC-Summary-Reaping. A DC-system-wide SLA (service level agreement) on GC-Summaries is defined (e.g. keep GC-summaries<ten (10) minutes) and PrimaryDC reaps GC-Summaries not covered by the SLA (e.g. GC-summaries older than ten (10) minutes, etc.) using an LRU algorithm. The PrimaryDC can send Reap-Deltas to other DCs (e.g. all other DCs) that can then permanently remove the GC-Summary and then ACK the Reap-Delta. When the PrimaryDC has received Reap-Delta-ACKs from the other DCs, it can also remove the GC-Summary. This can ensure that the PrimaryDC has the lowest GC-Summary (e.g. the superset of positional information). Once a GC-summary is reaped, it can be considered permanently removed. If an Agent is offline for a time longer than the time covered by the SLA (e.g. ten (10) minutes) the Deltas with GC-versions that have been reaped may be rejected.

It is noted that agents may be offline for a SLA defined period of time (e.g. 10 minutes). This SLA can handle temporary network problems and/or network-lag; it can also cover the use-case where a device is offline.

When agents are temporarily offline and/or reconnect, they can synchronize any changes that occurred in the system while they were offline. It can also synchronize any changes they made locally while they were offline. A reconnecting agent informs its DC of the last change it received from the DC (e.g. using the 'cluster_processed' counter contained in every delta) and the DC responds with a list of keys that were changed since this change. The DC can maintain a cache of which keys have been modified, if the cluster_processed the agent sends when reconnecting is not found in the cache (e.g. it has been offline for greater than a specified period, etc.). The DC can inform the agent to do a full-synchronize operation.

The agent can then request the DC for the current copy of each of these keys. The DC can respond with the key's CRDT, as well as any GC-summaries the agent uses to update its pending deltas to the Primary-DCs current GC-version. The agent can use the supplied GC-summaries to form a positional metadata bridge to the current GC-version and rewrites the deltas (e.g. all deltas) to the current GC-version before transmitting them to the DCs. Accordingly, deltas injected into the system can be as close as possible to the PrImaryDC's current GC-version. This can lessen the chance the PrimaryDC may implement ReorderDeltas for them.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g. embodied in a machine-readable medium).

In addition, it can be appreciated that the various operations, processes, and methods disclosed herein can be embodied in a machine-readable medium and/or a machine accessible medium compatible with a data processing system (e.g. a computer system), and can be performed in any order (e.g. including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized method for implementing Conflict-free Replicated Data Type (CRDT) arrays in a datanet and useful for improving data storage systems comprising:
   wherein the datanet comprises a plurality of data centers and a plurality of agents and wherein the datanet comprises a distributed data synchronization platform,
   providing a CRDT array, wherein the CRDT array comprises a linked list, and wherein the CRDT array comprises a data type whose data modification operations commute when the data modification operations are concurrent;
   arranging each CRDT array element of the CRDT array to include a left-hand-neighbor (LHN) pointer;
   setting the LHN pointer to point to a previous CRDT element in the linked list;
   specifying the previous CRDT element's unique tuple;
   including the previous CRDT element's unique tuple into the LHN pointer;
   inserting a next element into the CRDT array;
   specifying a next LHN pointer for the next element inserted into the CRDT array, wherein the next LHN pointer is included into the next element;
   detecting that two elements in the CRDT array have an identical LHN pointer;
   ordering of the CRDT array, wherein the step of ordering of the CRDT array comprises:
   generating a tree data structure of linked lists;
   traversing the tree data structure; and generating an ordered CRDT array using the tree data structure.

2. The computerized method of claim 1 wherein the tree data structure is traversed in a left-to-right direct and a depth-first direction.

3. The computerized method of claim 2, wherein each element of the CRDT array comprises a metadata section and a data section.

4. The computerized method of claim 3, wherein the metadata section comprises a datanet-related information, and wherein the data section comprises a specified key.

\* \* \* \* \*